(12) United States Patent
Kang et al.

(10) Patent No.: US 12,314,584 B2
(45) Date of Patent: May 27, 2025

(54) UFS DEVICE, METHOD OF OPERATING THE UFS DEVICE, AND SYSTEM INCLUDING THE UFS DEVICE

(71) Applicant: SAMSUNG ELECTRONICS CO., LTD., Suwon-si (KR)

(72) Inventors: Youngsan Kang, Yongin-si (KR); Byoungsul Kim, Suwon-si (KR); Byungyo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 61 days.

(21) Appl. No.: 17/498,815

(22) Filed: Oct. 12, 2021

(65) Prior Publication Data

US 2022/0147254 A1 May 12, 2022

(30) Foreign Application Priority Data

Nov. 12, 2020 (KR) .......................... 10-2020-0151278

(51) Int. Cl.
*G06F 3/06* (2006.01)
(52) U.S. Cl.
CPC .......... *G06F 3/0635* (2013.01); *G06F 3/0613* (2013.01); *G06F 3/0659* (2013.01); *G06F 3/0679* (2013.01)
(58) Field of Classification Search
CPC .. G06F 13/4234; G06F 3/0635; G06F 3/0613; G06F 3/0659; G06F 3/0679; G11C 7/1072
See application file for complete search history.

(56) References Cited

U.S. PATENT DOCUMENTS

| | | | |
|---|---|---|---|
| 7,293,127 B2 | 11/2007 | Caruk | |
| 7,363,417 B1 | 4/2008 | Ngai | |
| 7,389,381 B1 | 6/2008 | Co | |
| 8,312,176 B1 * | 11/2012 | Carlson | ............... G06F 13/4282 710/5 |
| 10,515,032 B2 | 12/2019 | Li et al. | |
| 2015/0318030 A1 * | 11/2015 | Wilson | ................ G06F 13/4273 711/106 |
| 2016/0012846 A1 * | 1/2016 | Wilson | ............. G11B 20/10222 360/46 |
| 2019/0042524 A1 | 2/2019 | Das Sharma | |
| 2019/0050365 A1 | 2/2019 | Kopzon et al. | |
| 2019/0065430 A1 | 2/2019 | Kim et al. | |
| 2019/0158211 A1 * | 5/2019 | Fürst | .................... H04J 14/0279 |
| 2020/0233821 A1 * | 7/2020 | Kumar | ................ G06F 13/1668 |

* cited by examiner

*Primary Examiner* — Ernest Unelus

(74) *Attorney, Agent, or Firm* — Fish & Richardson P.C.

(57) ABSTRACT

A universal flash storage (UFS) device includes a UFS data lane comprising a first UFS lane for a first direction in which data is output to a UFS host, a second UFS lane for a second direction in which data is received from the UFS host, and bidirectional UFS lanes capable of switching the first direction and the second direction according to an operation mode. A UFS device controller switches a data transmission direction of the bidirectional UFS lanes, based on a control signal indicating the operation mode.

18 Claims, 18 Drawing Sheets

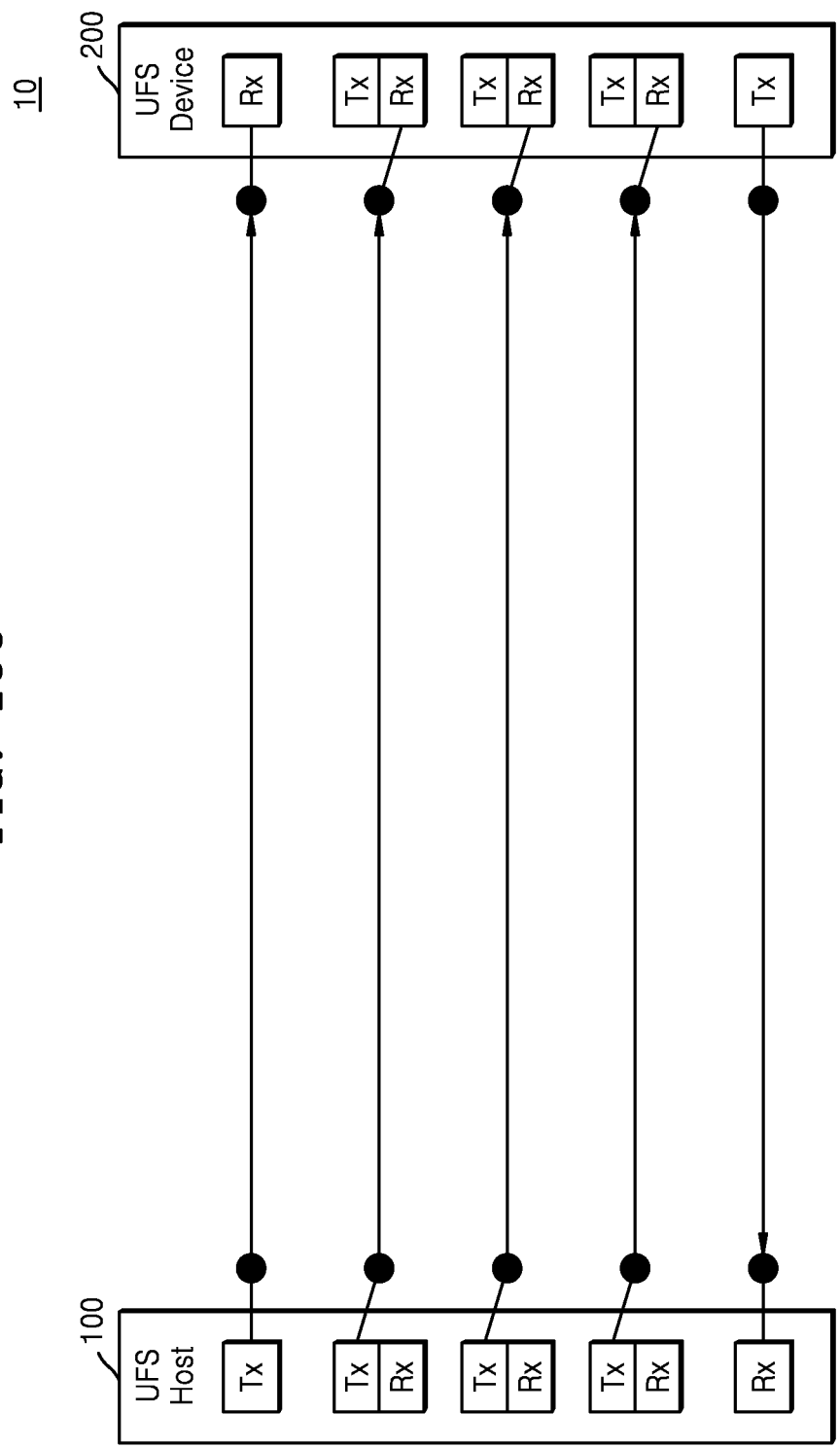

UFS DEVICE, METHOD OF OPERATING THE UFS DEVICE, AND SYSTEM INCLUDING THE UFS DEVICE

CROSS-REFERENCE TO RELATED APPLICATION

This U.S. nonprovisional patent application is based on and claims priority under 35 U.S.C. § 119 to Korean Patent Application No. 10-2020-0151278, filed on Nov. 12, 2020 in the Korean Intellectual Property Office, the disclosure of which is incorporated by reference herein in its entirety.

BACKGROUND

Technical Field

The inventive concept(s) described herein relate to a memory device, and more particularly, to a universal flash storage (UFS) device, a method of operating the UFS device, and a UFS system including the UFS device.

Background Art

A storage system may include a host and a storage device. The host and the storage device may be connected to each other via various standard interfaces, such as a universal flash storage (UFS) interface, serial advanced technology attachment (SATA), a small computer small interface (SCSI), a serial attached SCSI (SAS), and an embedded multi-media card (MMC). When the storage system is used for a mobile device, a high-speed operation between the host and the storage device may be very important. However, performance degradation may occur due to congestion of transmission data when there are great differences in amounts of upstream and downstream transmission data between the host and the storage device.

SUMMARY

The inventive concept(s) described herein provide a universal flash storage (UFS) device using an interface including an asymmetric lane between the UFS device and a UFS host device in a UFS system, a method of operating the UFS device, and a UFS system including the UFS device.

According to an aspect of the present disclosure, a UFS device includes a plurality of UFS data lanes and a UFS controller. The UFS data lanes includes a first UFS lane for a first direction in which data is output to a UFS host, a second UFS lane for a second direction in which data is received from the UFS host, and bidirectional UFS lanes capable of switching the first direction and the second direction according to an operation mode. The UFS device controller switches a data transmission direction of the bidirectional UFS lanes, based on a control signal indicating the operation mode.

According to another aspect of the present disclosure, a UFS system includes a UFS host. The UFS host includes an application processor, a UFS driver and a UFS host controller. The application processor includes at least one core configured to execute instructions. The UFS driver receives a request from the application processor and translates the request into a UFS command. The UFS host controller transmits the translated UFS command to a UFS device. The UFS device includes a UFS device controller configured to switch a data transmission direction of bidirectional UFS lanes, based on a plurality of UFS data lanes and an operation mode. The UFS data lanes include a first UFS lane for a first direction in which data is output to the UFS host, a second UFS lane for a second direction in which data is received from the UFS host, and bidirectional UFS lanes capable of switching the first direction and the second direction according to the operation mode.

According to another aspect of the present disclosure, a first UFS device includes at least one UFS data lane including a receiving lane configured to receive input data from a second UFS device. A transmission lane transmits output data to the second UFS device. At least one bidirectional lane transmits the input data and/or the output data according to an operation mode thereof. A UFS controller generates a state information value, based on a size of the input data or the output data and the number of UFS data lanes, and determines the operation mode of the at least one bidirectional lane, based on the state information value.

BRIEF DESCRIPTION OF THE DRAWINGS

Embodiments of the present disclosure will be more clearly understood from the following detailed description taken in conjunction with the accompanying drawings in which:

FIG. 10A, FIG. 10B and FIG. 10C respectively illustrate examples of various asymmetric lanes according to example embodiments;

DETAILED DESCRIPTION OF THE EMBODIMENTS

Hereinafter, example embodiments will be described in detail with reference to the accompanying drawings.

Figure 1:
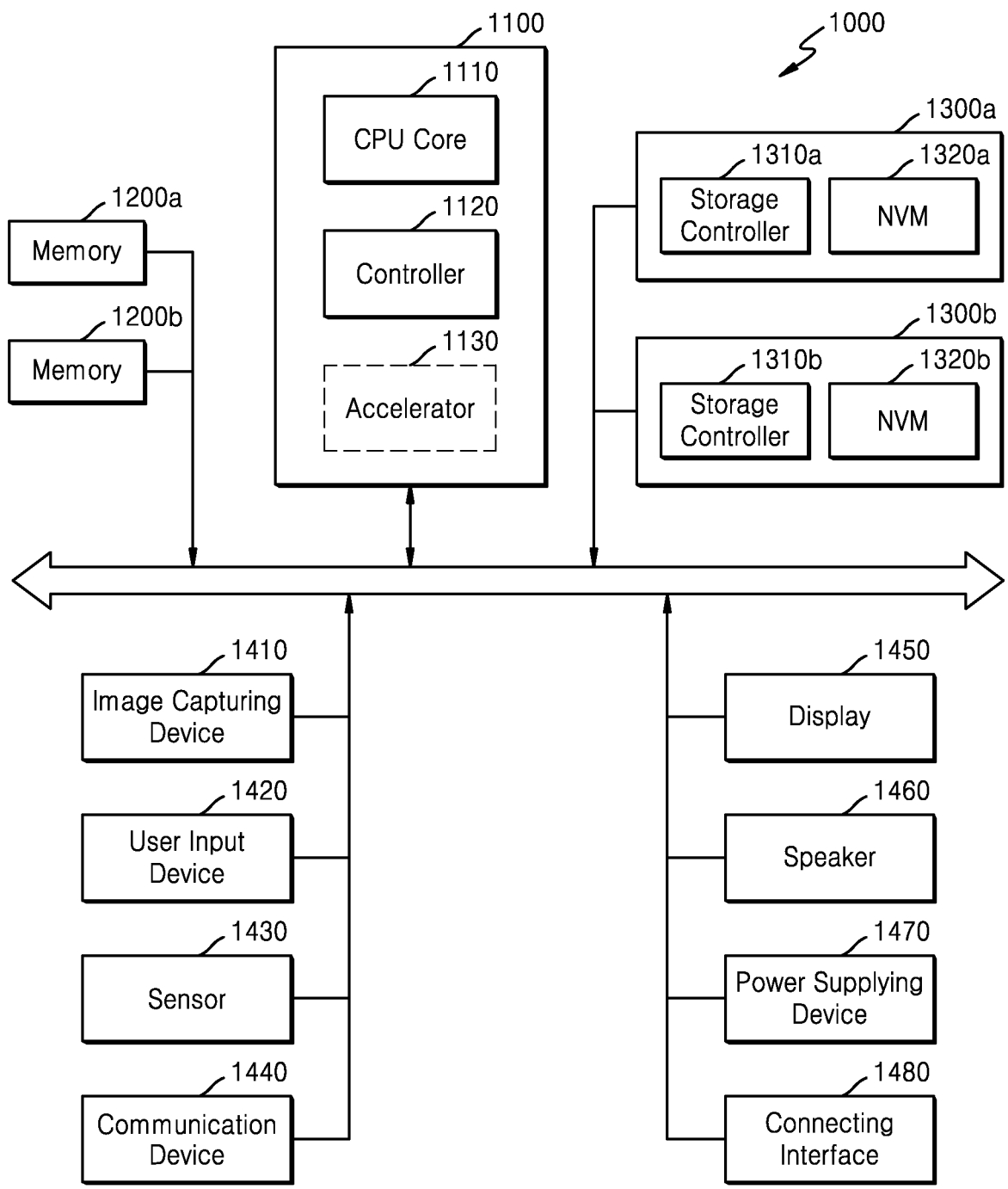
FIG. 1 is a diagram illustrating a system to which a storage device is applied, according to an embodiment.

FIG. 1 is a diagram illustrating a system 1000 to which a storage device is applied, according to an embodiment.

Referring to FIG. 1, the system 1000 of FIG. 1 may comprise a mobile system, such as a portable communication terminal (e.g., a mobile phone), a smartphone, a tablet personal computer (PC), a laptop computer, a wearable device, a healthcare device, or an Internet of things (IOT) device. However, the system 1000 of FIG. 1 is not necessarily limited to a mobile system and may also or alternatively comprise a PC, a server, a media player, or an automotive device (e.g., a navigation device).

Referring to FIG. 1, the system 1000 may include a main processor 1100, memories 1200a and 1200b, and storage devices (e.g., the storage devices 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000 and, more specifically, operations of other components included in the system 1000. The main processor 1100 may be implemented as a general-purpose processor, a dedicated processor, or an application processor. In many embodiments herein, descriptions of functions and steps implemented by a UFS host may be understood to include functions and steps implemented by an application processor used as a main processor 1100 executing instructions.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator block 1130, which is a dedicated circuit for a high-speed data operation, such as an artificial intelligence (AI) data operation. The accelerator block 1130 may include a graphics processing unit (GPU), a neural processing unit (NPU) and/or a data processing unit (DPU) and may be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory (NVM), such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers 1310a and 1310b and NVMs 1320a and 1320b configured to store data via the control of the storage controllers 1310a and 1310b. Although the NVMs 1320a and 1320b may include NAND flash memories, the NVMs 1320a and 1320b may include other types of NVMs, such as PRAM and/or RRAM.

The storage devices 1300a and 1300b may be physically separated from the main processor 1100 and included in the system 1000 or may be implemented in the same package as the main processor 1100. In addition, the storage devices 1300a and 1300b may have types of memory cards and may be removably combined with other components of the system 1000 via an interface, such as the connecting interface 1480 that will be described below. The storage devices 1300a and 1300b may be devices to which a standard protocol, such as a universal flash storage (UFS), is applied. For example, the storage devices 1300a and 1300b may correspond to UFS cards, in which case the connecting interface may be a UFS interface circuit and in which case the storage devices 1300a and 1300b may comply with a UFS protocol.

The image capturing device 1410 may capture still images or moving images, and may be or include a camera, a camcorder, and/or a webcam.

The user input device 1420 may receive various types of data input by a user of the system 1000 and may be or include a touch pad, a keypad, a keyboard, a mouse, and a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, an interface and/or a modem. The communication device 1440 may communicate wirelessly and/or may communicate by wire, such as through a port or another type of communication interface.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source and supply the converted power to each other component of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
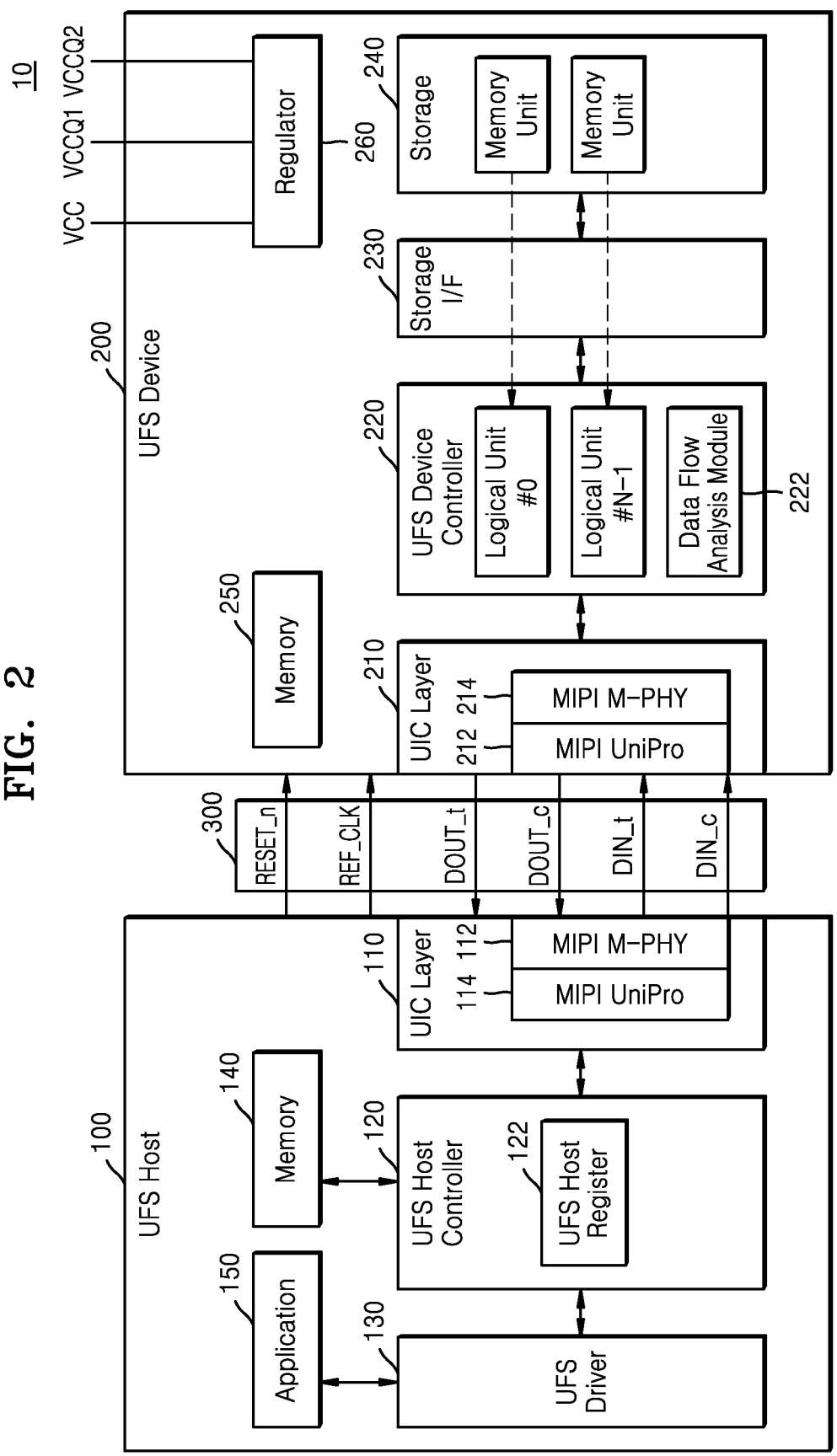
FIG. 2 is a diagram illustrating a universal flash storage (UFS) system according to an embodiment.

FIG. 2 is a diagram illustrating a UFS system 10 according to an embodiment.

The UFS system 10 may be a system conforming to a UFS standard announced by Joint Electron Device Engineering Council (JEDEC) and include a UFS host 100, a UFS device 200, and a UFS interface 300. The above description of the system 1000 of FIG. 1 may also be applied to the UFS system 10 of FIG. 2 to an extent that does not conflict with the following description of FIG. 2. The UFS interface 300 may be or include a UFS interface circuit, and in some embodiments may include the configuration of elements between the UFS host 100 and the UFS device 200 shown in and described with respect to FIG. 3A, FIG. 3B, FIG. 4A and/or FIG. 4B below.

Referring to FIG. 2, the UFS host 100 may be connected to the UFS device 200 via the UFS interface 300. When the main processor 1100 of FIG. 1 is an AP, the AP may be implemented as a component of the UFS host 100.

The UFS host 100 may also include an application 150, a UFS driver 130, a UFS host controller 120, a memory 140, and a UIC layer 110 (UFS interconnect layer). The UFS host controller 120 may correspond to the controller 1120 of the main processor 1100 of FIG. 1, and the memory 140 may correspond to the memories 1200*a* and 1200*b* and the storage devices 1300*a* and 1300*b* of FIG. 1. The UFS host controller 120 may be implemented as a component of an application processor comprising at least one core configured to execute instructions.

The UFS device 200 may include a UFS device controller 220, a storage 240, a storage interface 230, a memory 250, and a UIC layer 210. The storage 240 may include a plurality of NVM units. The UFS device 200 may correspond to one or both of the storage devices 1300*a* and 1300*b* in FIG. 1, such as when the UFS host 100 includes an AP as the main processor 1100 in FIG. 1.

The application 150 may refer to a program configured to communicate with the UFS device 200 to use functions of the UFS device 200. The application 150 may transmit input-output requests (IORs) to the UFS driver 130 for input/output (I/O) operations on the UFS device 200. The IORs may refer to a data read request, a data storage (or write) request, and/or a data discard request, without being limited thereto.

The UFS driver 130 may manage the UFS host controller 120 via a UFS-host controller interface (UFS-HCI). The UFS driver 130 may convert the IOR generated by the application 150 into a UFS command defined by the UFS standard and may transmit the UFS command to the UFS host controller 120. One IOR may be converted into a plurality of UFS commands. Although the UFS command may be defined by an SCSI standard, the UFS command may be a command dedicated to the UFS standard.

The UFS host controller 120 may transmit the UFS command converted by the UFS driver 130 to the UIC layer 210 of the UFS device 200 via the UIC layer 110 of the UFS host 100 and the UFS interface 300. During the transmission of the UFS command, a UFS host register 122 of the UFS host controller 120 may serve as a command queue (CQ).

The UIC layer 110 on the side of the UFS host 100 may include a MIPI Unipro 114 (mobile industry processor interface (MIPI) Unipro) and an MIPI M-PHY 112. The UIC layer 210 on the side of the UFS device 200 may also include an MIPI M-PHY 212 and an MIPI Unipro 214.

The UFS interface 300 may include a line configured to transmit a reference clock signal REF_CLK, a line configured to transmit a hardware reset signal RESET_n for the UFS device 200, a pair of lines configured to transmit a pair of differential input signals DIN_t and DIN_c, and a pair of lines configured to transmit a pair of differential output signals DOUT_t and DOUT_c.

A reference clock signal REF_CLK provided from the UFS host 100 to the UFS device 200 may operate at any one of four frequencies of 19.2 MHz, 26 MHz, 38.4 MHz, and 52 MHz, without being limited thereto.

The UFS host 100 may change the frequency of the reference clock signal REF_CLK during an operation, that is, during data transmission/receiving operations between the UFS host 100 and the UFS device 200. The UFS device 200 may generate clock signals having various frequencies from the reference clock signal REF_CLK provided from the UFS host 100, by using a phase-locked loop (PLL).

The UFS interface 300 may support a plurality of lanes, each of which may be implemented as a differential pair. For example, the UFS interface 300 may include at least one receiving lane and at least one transmission lane. A pair of lines configured to transmit a pair of differential input signals DIN_t and DIN_c may correspond to a receiving lane, and a pair of lines configured to transmit a pair of differential output signals DOUT_t and DOUT_c may correspond to a transmission lane.

The at least one receiving lane and the at least one transmission lane may transmit data based on a serial communication scheme. Full-duplex communications between the UFS host 100 and the UFS device 200 may be enabled based on a structure in which the at least one receiving lane is separated from the at least one transmission lane.

When a command from the UFS host 100 is input via the UIC layer 210 into the UFS device 200, the UFS device controller 220 may perform an operation in response to the command and may transmit a completion response to the UFS host 100 when the operation is completed.

As an example, when the input command is a write command, the UFS device controller 220 may temporarily store write data provided from the UFS host 100 in the memory 250. By using the storage interface 230, the UFS device controller 220 may store the write data, which is temporarily stored in the memory 250, at a selected position of an NVM block.

The UFS device controller 220 may manage the storage 240 by using a logical unit (LU), which is a logical data storage unit. The number of LUs may be 8, without being limited thereto.

The UFS device controller 220 may include a flash translation layer (FTL) and may convert a logical data address (e.g., a logical block address (LBA)) transmitted from the UFS host 100 into a physical data address (e.g., a physical block address (PBA)) by using the FTL. In the UFS system 10, a minimum size of a logical block configured to store user data may be set to 4 Kbytes.

The UFS device controller 220 may further include a data flow analysis module 222. The data flow analysis module 222 may detect the amount of data subjectively transmitted and received by the UFS device 200. The data flow analysis module 222 deactivate one or more of at least one bidirectional lane based on the detected amount of data, or otherwise determines an operation mode of the at least one bidirectional lane. The data flow analysis module 222 may comprise a monitoring circuit configured to determine the operation mode, based on at least a size of data output from the UFS device 200 and/or a size of data input into the UFS device 200. For example, the data flow analysis module 222 may determine a card operation mode based on at least a size of output data output to a UFS card and a size of input data received from the UFS card. Although not shown in FIG. 2, the UFS device 200 may include a plurality of card UFS data lanes for electrical connection with a UFS card, and a card UFS interface circuit configured to connect the plurality of card UFS data lanes to the UFS device controller 220. Embodiments explaining the use of a UFS card 400 are described further, for example, with respect to FIG. 12 below.

According to an embodiment, the data flow analysis module 222 may compare a size of data received by the UFS device 200 with a size of data transmitted to the UFS host 100 and determine the switching of the operation mode based on the comparison result. For example, when a ratio of the size of data transmitted to the UFS host 100 to the size of data received by the UFS device 200 exceeds a predefined threshold value, the data flow analysis module 222 may transmit a signal for requesting the UFS host 100 to switch the operation mode of the at least one bidirectional lane to a transmission mode to the UFS host 100 or the UFS device 200 may transmit a control signal for instructing the UFS host 100 to switch the operation mode of the at least one bidirectional lane to the transmission mode to the UFS host 100.

The flow analysis module 222 as a monitoring circuit may determine an operation mode of the bidirectional UFS lanes, based on a first ratio and a second ratio. The first ratio is a ratio of a size of data transmitted by the UFS lanes for the first direction to a size of data output to the UFS host 100, and the second ratio is a ratio of a size of data transmitted by the UFS lanes for the second direction to a size of data received from the UFS host 100. The data flow analysis module 222 may switch the bidirectional UFS lanes such that a number of UFS lanes corresponding to the first direction is greater than the a number of UFS lanes corresponding to the second direction, from among the bidirectional UFS lanes, when the first ratio is greater than the second ratio. The data flow analysis module 222 may switch the bidirectional UFS lanes such that the number of UFS lanes corresponding to the first direction is less than the number of UFS lanes corresponding to the second direction, from among the bidirectional UFS lanes, when the first ratio is less than the second ratio. The data flow analysis module 222 may also deactivate at least some of the bidirectional UFS lanes when each of the first ratio and the second ratio is less than a lower-limit threshold value.

As described below, when the UFS device 200 transmits the control signal for instructing the UFS host 100 to switch the operation mode of the at least one bidirectional lane to the UFS host 100, the UFS device 200 may correspond to a UFS local device, and the UFS host 100 may correspond to a UFS remote device. The control signal output by the UFS device 200 to instruct the UFS host 100 to switch the operation mode may correspond to a PACP_SET_req signal according to the MIPI Unipro standard.

According to another embodiment, the data flow analysis module 222 may periodically request data flow analysis information from the UFS host 100 at every predefined time. When the data flow analysis module 222 directly compares the sizes of data transmitted and received by the UFS device 200, there may be a heavy load on the UFS device 200, thus causing performance degradation, such as a reduction in I/O speed of the UFS device 200. In response to the request received from the data flow analysis module 222 of the UFS device controller 220, the application 150 of the UFS host 100 may transmit the data flow analysis information, such as a ratio and size of data transmitted and received between the UFS host 100 and the UFS device 200, to the UFS device controller 220. Based on the received data flow analysis information, the data flow analysis module 222 may request the UFS host 100 to switch the operation mode of the at least one bidirectional lane or output a control signal for directly instructing the UFS device 200 to switch the operation mode of the at least one bidirectional lane. For example, the UFS device controller 220 may request state information from the UFS host 100, and may transmit a control signal to the UFS host 100 for requesting the UFS host 100 to change the operation mode based on the state information received in response to the request.

The UFS host 100 may sequentially store commands, which are to be transmitted to the UFS device 200, in the UFS host register 122 that may serve as a CQ. The UFS host 100 may sequentially transmit the commands to the UFS device 200. In this case, even while a previously transmitted command is still being processed by the UFS device 200, that is, even before receiving a notification that the previously transmitted command has been processed by the UFS device 200, the UFS host 100 may transmit a next command, which is on standby in the CQ, to the UFS device 200. Thus, the UFS device 200 may also receive a next command from the UFS host 100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of a plurality of memory units 350-0 to 350-N may include a memory cell array and a control circuit configured to control an operation of the memory cell array. The memory cell array may include a two-dimensional (2D) memory cell array or a three-dimensional (3D) memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND (VNAND) string in which at least one memory cell is vertically oriented and located on another memory cell.

Voltages VCC, VCCQ, and VCCQ2 may be applied as power supply voltages to the UFS device 200. The voltage VCC may be a main power supply voltage for the UFS device 200 and may be in a range of about 2.4 V to about 3.6 V. The voltage VCCQ may be a power supply voltage for supplying a low voltage mainly to the UFS device controller 220 and may be in a range of about 1.14 V to about 1.26 V. The voltage VCCQ2 may be a power supply voltage for supplying a voltage, which is lower than the voltage VCC and higher than the voltage VCCQ, mainly to an I/O interface, such as an MIPI M-PHY, and may be in a range of about 1.7 V to about 1.95 V. The power supply voltages may be supplied through a regulator 260 to respective components of the UFS device 200.

Figure 3A:
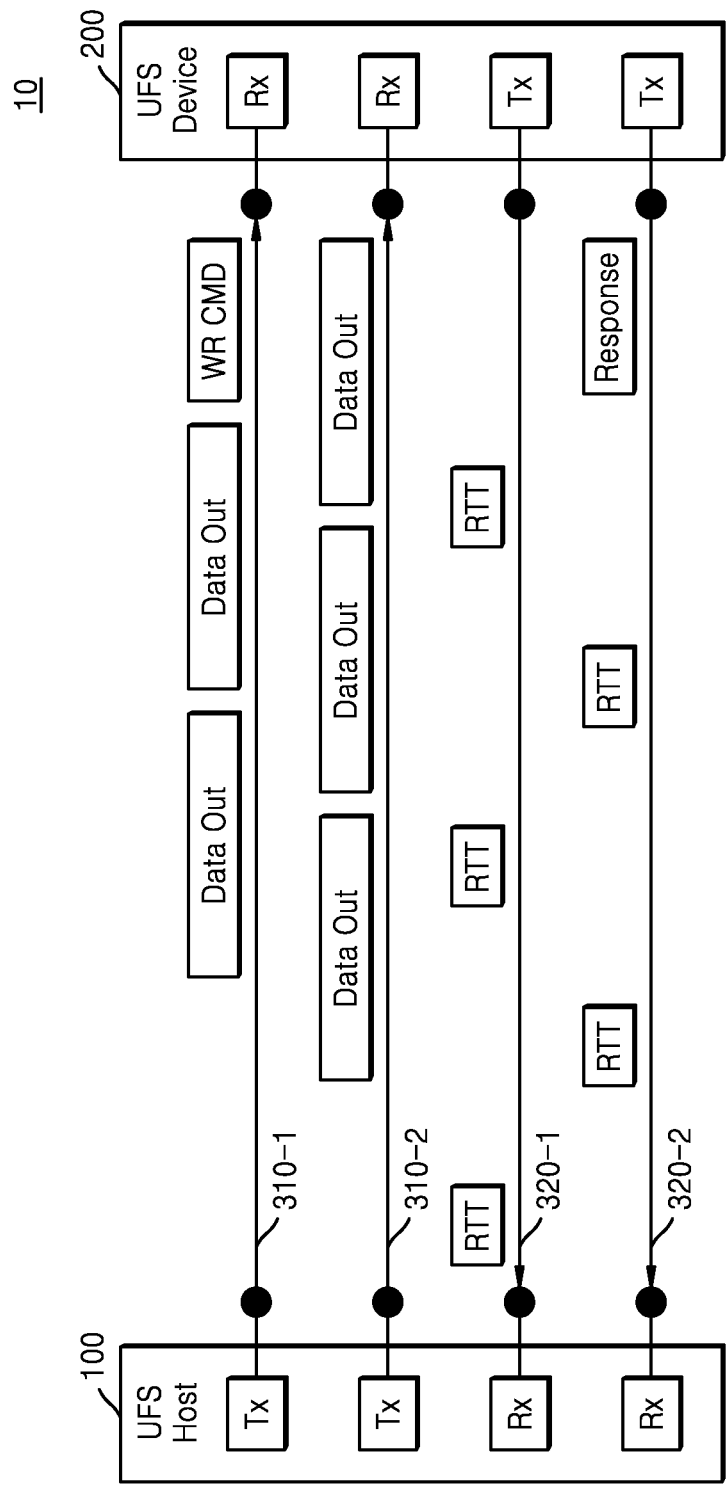
FIG. 3A illustrates data flow when a write command is executed in a UFS system according to an embodiment.

FIG. 3A illustrates data flow when a write command is executed in a UFS system according to an embodiment. Descriptions that overlap the description of FIG. 2 will be omitted to the extent possible for the sake of brevity.

Referring to FIG. 3A, the UFS host 100 may be connected to the UFS device 200 via four lanes. The four lanes in FIG. 3A may include four lanes of a UFS interface circuit such as the UFS interface 300 in FIG. 2. Alternatively, the four lanes shown in FIG. 3A may include four lanes of a UFS device 200 in FIG. 2 Alternatively, the four lanes shown in FIG. 3A may include four lanes of a UFS host 100 in FIG. 2. Alternatively, the four lanes shown in FIG. 3A may include elements of the UFS interface 300 and/or the UFS device 200 and/or the UFS host 100 in FIG. 2.

The four lanes may include two transmission lanes (e.g., first transmission lane 310-1 and second transmission lane 310-2) and two receiving lanes (e.g., first receiving lane 320-1 and second receiving lane 320-2). For brevity, hereinafter, it is assumed that it is determined whether an arbitrary lane is a transmission lane or a receiving lane based on the UFS host 100. The transmission lane may be referred to as a downstream lane, and the receiving lane may be referred to as an upstream lane. According to various embodiments, the receiving lane may be referred to as a UFS lane according to a first direction, and the transmission lane may be referred to as a UFS lane according to a second direction. Here, the first direction may refer to a direction in which data is transmitted from the UFS device 200 to the UFS host 100, and the second direction may refer to a direction in which data is transmitted from the UFS host 100 to the UFS device 200.

The first transmission lane 310-1 and second transmission lane 310-2 and the first receiving lane 320-1 and second receiving lane 320-2 may correspond to unidirectional lanes. That is, each of the first transmission lane 310-1 and second transmission lane 310-2 may transmit a command and/or data from the UFS host 100 to the UFS device 200, and each of the first receiving lane 320-1 and second receiving lane 320-2 may receive data, which is transmitted from the UFS device 200 to the UFS host 100.

For example, when the application 150 requests to store data in the UFS device 200, the UFS host 100 may transmit a write command WR CMD to the UFS device 200. Referring to FIG. 3A, the UFS host 100 may transmit the write command WR CMD to the UFS device 200 via the first transmission lane 310-1. The UFS device 200 may receive the write command WR CMD and detect an entire size of write data WR DATA.

Subsequently, the UFS device 200 may transmit a ready to transfer (RTT) to the UFS host 100 in response to the receiving of the write command WR CMD. By using the RTT, the UFS device 200 may inform the UFS host 100 that the write data WR DATA is to be divided according to a predefined size and transmitted. The UFS host 100 may receive the RTT and output the write data WR DATA in response to the RTT. In this case, because two transmission lanes and two receiving lanes are provided, when the UFS host 100 receives, from the UFS device 200, the RTT via the first receiving lane 320-1, the UFS host 100 may transmit, to the UFS device 200, first partial data DATA OUT #1 of the write data via the first transmission lane 310-1. When the UFS host 100 receives, from the UFS device 200, the RTT via the second receiving lane 320-2, the UFS host 100 may transmit, to the UFS device 200, second partial data DATA OUT #2 of the write data via the second transmission lane 310-2. That is, the UFS host 100 may transmit the write data to the UFS device 200 by alternately using the first transmission lane 310-1 and the second transmission lane 310-2. It can be seen that a bandwidth is doubled as compared to a case of transmitting the write data to the UFS device 200 using only one transmission lane.

The UFS device 200 may determine that all of the write data has been received, and may transmit a response to the UFS host 100 via a receiving lane in response to the receiving of the write data. The UFS host 100 may receive the response and determine that the write command has been completed.

Figure 3B:
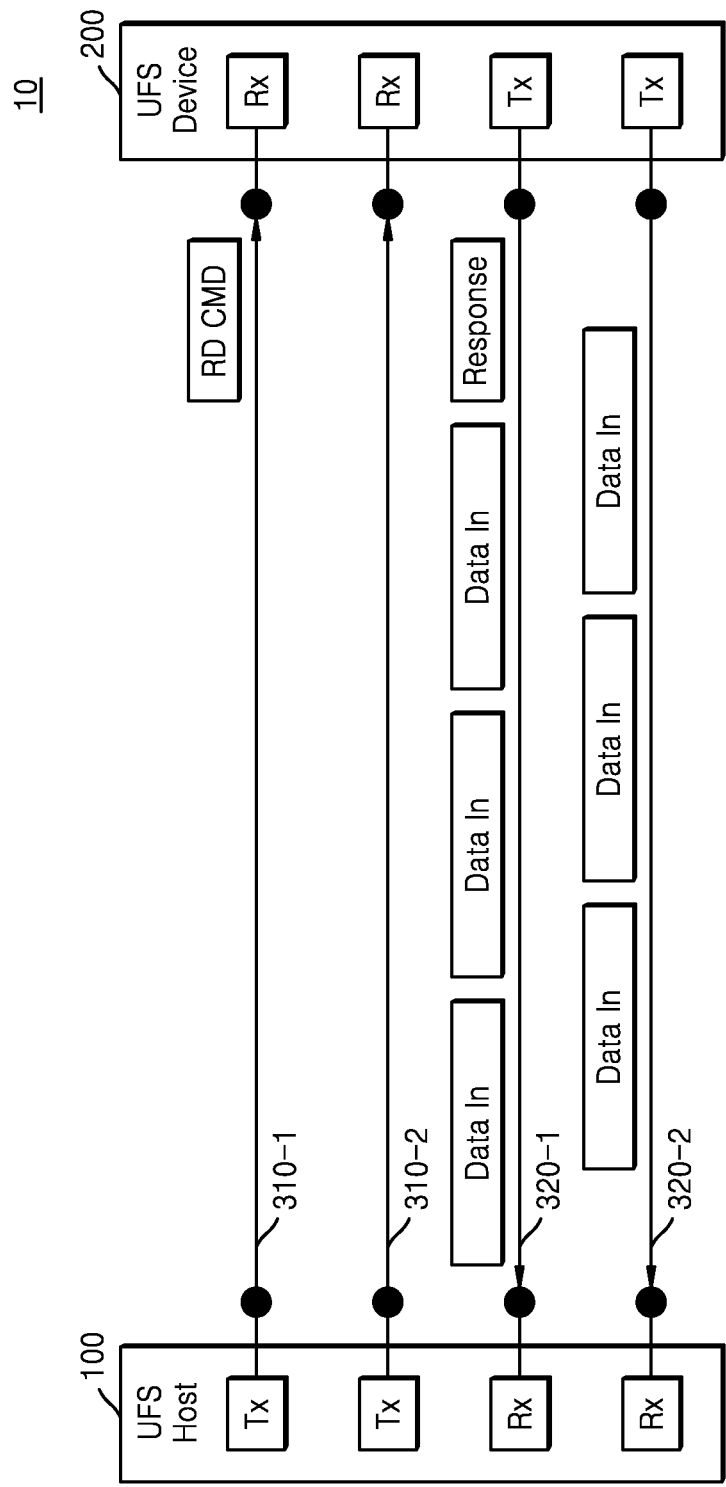
FIG. 3B illustrates data flow when a read command is executed in a UFS system according to an embodiment.

FIG. 3B illustrates data flow when a read command is executed in a UFS system according to an embodiment. Descriptions that overlap the description of FIG. 3A and/or FIG. 2 will be omitted to the extent possible for the sake of brevity.

Referring to FIG. 3B, the application 150 may request to read data stored in the UFS device 200. The UFS host 100 may transmit a read command RD CMD to the UFS device 200 based on the request.

In FIG. 3B, four lanes shown may again be four lanes of a UFS interface circuit such as the UFS interface 300 in FIG. 2. Alternatively, the four lanes shown in FIG. 3B may be four lanes of a UFS device 200 in FIG. 2. Alternatively, the four lanes shown in FIG. 3B may be four lanes of a UFS host 100 in FIG. 2. Alternatively, the four lanes shown in FIG. 3B may include elements of a UFS interface 300 and/or a UFS device 200 and/or a UFS host 100 in FIG. 2.

Referring to FIG. 3B, the UFS host 100 may transmit the read command RD CMD to the UFS device 200 via a first transmission lane 310-1. The UFS device 200 may receive the read command RD CMD and may transmit read data to the UFS host 100.

Thereafter, the UFS device 200 may sequentially transmit the read data to the UFS host 100 in response to the receiving of the read command RD CMD. Because the UFS host 100 may receive the read data at any time, the UFS device 200 may bypass transmission of the RTT before transmitting the read data to the UFS host 100, unlike FIG. 3A described above.

The UFS device 200 may transmit first partial data DATA IN #1 of the read data to the UFS host 100 via a first receiving lane 320-1 and may transmit second partial data DATA IN #2 of the write data to the UFS host 100 via a second receiving lane 320-2. That is, the UFS device 200 may transmit the read data to the UFS host 100 by alternately using the first receiving lane 320-1 and the second receiving lane 320-2. A bandwidth may be doubled as compared to a case of transmitting the read data to the UFS host 100 using only one receiving lane.

The UFS device 200 may determine that all of the read data has been transmitted, and may transmit a response to the UFS host 100 via a receiving lane in response to the receiving of the read data. The UFS host 100 may determine that the read command has been completed by receiving the response from the UFS device 200.

Figure 4A:
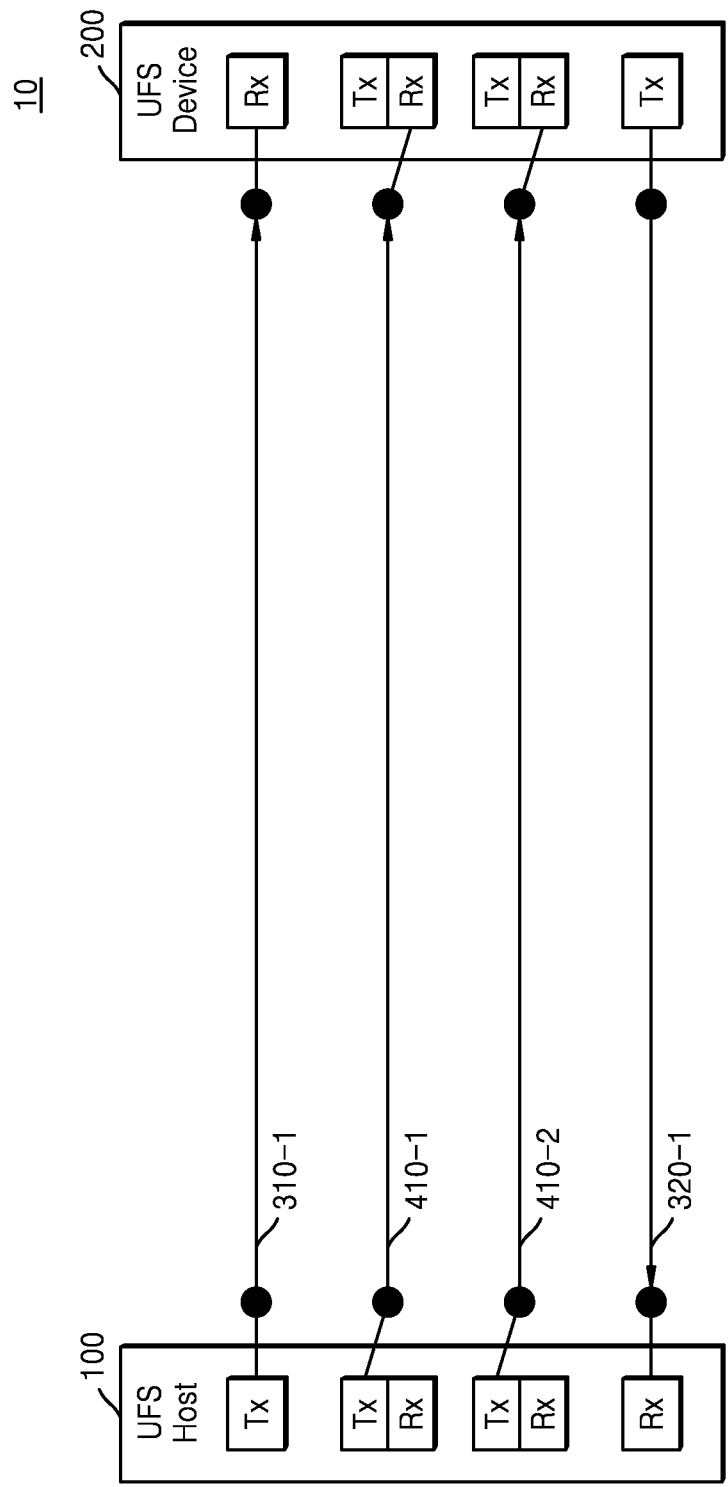
FIG. 4A is a diagram illustrating a UFS system according to an example embodiment.

FIG. 4A is a diagram illustrating a UFS system according to an example embodiment. Descriptions that overlap the description of FIG. 2, FIG. 3A and/or FIG. 3B will be omitted to the extent possible for the sake of brevity.

The four lanes in FIG. 4A may again be four lanes of a UFS interface circuit such as the UFS interface 300 in FIG. 2. Alternatively, the four lanes in FIG. 4A may be four lanes of a UFS device 200 in FIG. 2. Alternatively, the four lanes in FIG. 4A may be four lanes of a UFS host 100 in FIG. 2. Alternatively, the four lanes in FIG. 4A may include elements of the UFS interface 300 and/or the UFS device 200 and/or the UFS host 100 in FIG. 2.

In FIG. 4A, the four lanes include bidirectional UFS lanes capable of switching directions according to an operation mode. Referring to FIG. 4A, the UFS system 10 may include bidirectional lanes 410-1 and 410-2. The first transmission lane 310-1 may allow the UFS host 100 to only transmit data to the UFS device 200, and the first receiving lane 320-1 may allow the UFS host 100 to only receive data from the UFS device 200. In contrast, the bidirectional lanes 410-1 and 410-2 may receive data from the UFS device 200 or transmit data to the UFS device 200.

According to an embodiment, the UFS host 100 may transmit write data to the UFS device 200 via three transmission lanes. For example, when all of the bidirectional lanes 410-1 and 410-2 are set to transmission lanes, the UFS host 100 may transmit the write data to the UFS device 200 via the three transmission lanes. Accordingly, even when a clock speed of transmitting write data is not increased, the UFS host 100 may increase the speed of transmitting write data according to an increased bandwidth.

According to another embodiment, the UFS host 100 may receive read data from the UFS device 200 via three receiving lanes. For example, when all of the bidirectional lanes 410-1 and 410-2 are set to receiving lanes, the UFS host 100 may receive the read data from the UFS device 200 via three receiving lanes. Accordingly, even when a clock speed of transmitting read data is not increased, the UFS host 100 may increase the speed of receiving read data according to an increased bandwidth.

According to another embodiment, the UFS host 100 may transmit and receive data to and from the UFS device 200 via two transmission lanes and two receiving lanes. That is, when one of the bidirectional lanes 410-1 and 410-2 is set to a receiving lane and the other one thereof is set to a transmission lane, the UFS system shown in FIG. 4A may be the same as the UFS system 10 shown in FIG. 3A and FIG. 3B.

Figure 4B:
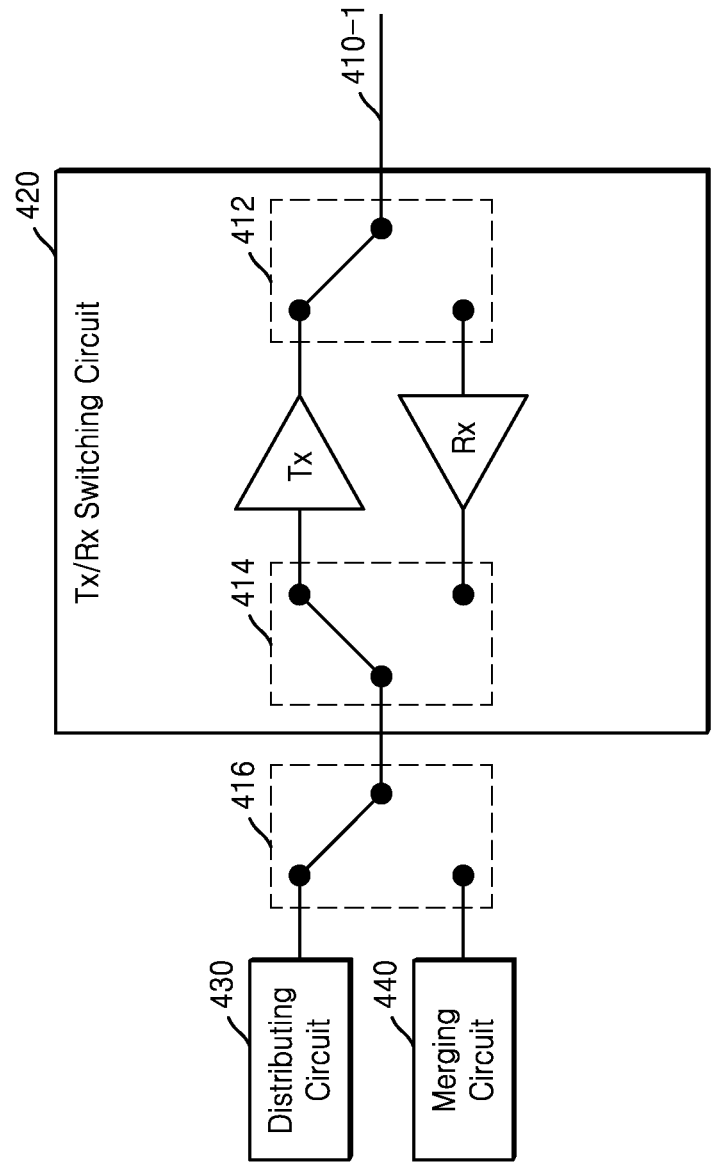
FIG. 4B is a diagram illustrating a bidirectional lane according to an example embodiment.

FIG. 4B is a diagram illustrating a bidirectional lane 410-1 according to an example embodiment.

The bidirectional lane 410-1 in FIG. 4B may be a lane of a UFS interface circuit such as the UFS interface 300 in FIG. 2. Alternatively, the bidirectional lane 410-1 in FIG. 4B may be a lane of a UFS device 200 in FIG. 2. Alternatively, the bidirectional lane 410-1 in FIG. 4B may be a lane of a UFS host 100 in FIG. 2. Alternatively, the lane in FIG. 4A may include elements of the UFS interface 300 and/or the UFS device 200 and/or the UFS host 100 in FIG. 2.

Referring to FIG. 4B, the bidirectional lane 410-1 may include a plurality of switches (e.g., 412 to 416), a transmission/receiving (Tx/Rx) switching circuit 420, a distributing circuit 430, and a merging circuit 440. The plurality of switches in FIG. 4B are representative of switches that may be provided in a plurality of switching circuits distributed among the UFS device 200, the UFS host 100 and/or the UFS interface 300.

According to various embodiments, the switches 412 to 416 may change a transceiving mode of the bidirectional lane 410-1 in response to a control signal CTRL SIG from the UFS host 100. In an embodiment, the UFS driver 130 may transmit a control signal indicating a transmission mode to the switches 412, 414, and 416. The switches 412, 414, and 416 may perform switching operations based on the control signal. For example, the distributing circuit 430, the switch 416, the switch 414, a transmission amplifier 402, and the switch 412 may be sequentially connected to form a transmission path. In another embodiment, the UFS driver 130 may transmit a control signal indicating a receiving mode to the switches 412, 414, and 416. The switches 412, 414, 416 may perform switching operations based on the control signal. For example, the switch 412, a receiving amplifier 404, the switch 414, the switch 416, and the merging circuit 440 may be sequentially connected to form a receiving path.

According to various embodiments, the distributing circuit 430 may be simultaneously connected to at least two transmission paths. Referring to FIG. 4A and FIG. 4B together, when the bidirectional lanes 410-1 and 410-2 are switched to a transmission mode, the distributing circuit 430 may be simultaneously connected to at least two lanes of the first transmission lane 310-1 and the bidirectional lanes 410-1 and 410-2. The distributing circuit 430 may distribute and transmit write data to each of the at least two transmission lanes simultaneously connected thereto. For example, when both the bidirectional lanes 410-1 and 410-2 are switched to transmission lanes, the distributing circuit 430 may be controlled to uniformly divide the write data into three transmission lanes at the same time and may transmit the write data to the UFS device 200.

According to various embodiments, the merging circuit 440 may be simultaneously connected to at least two receiving paths. Referring to FIG. 4A and FIG. 4B together, when the bidirectional lanes 410-1 and 410-2 are switched to a receiving mode, the merging circuit 440 may be simultaneously connected to at least two lanes of the first receiving lane 320-1 and the bidirectional lanes 410-1 and 410-2. The merging circuit 440 may receive read data from each of the at least two receiving lanes simultaneously connected thereto, and merge the received read data. For example, when all of the bidirectional lanes 410-1 are 410-2 are switched to receiving lanes, the merging circuit 440 may simultaneously receive the read data from each of three receiving lanes, merge the received read data, and transmit the merged read data to the UFS driver 130.

Figure 5A:
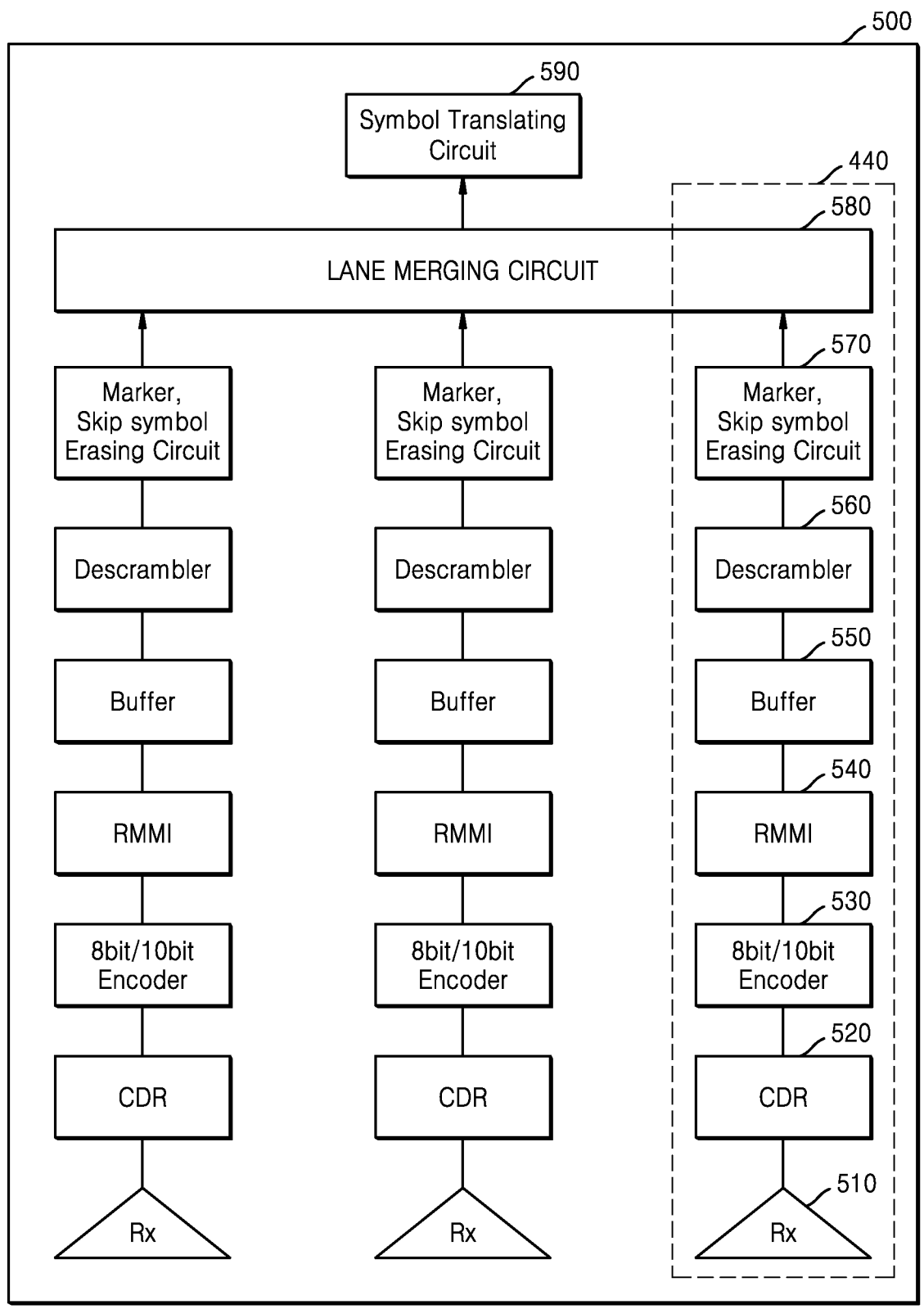
FIG. 5A is a block diagram illustrating a merging circuit according to an example embodiment.

FIG. 5A is a block diagram illustrating a lane merging circuit 500 according to an example embodiment.

The lane merging circuit 500 of FIG. 5A may include at least the merging circuit 440 of FIG. 4B. For brevity, hereinafter, it is assumed that the lane merging circuit 500 of FIG. 5A merges read data received from three receiving lanes and that the lane merging circuit 500 is included in the UFS host 100 in FIG. 2. Alternatively, the lane merging circuit 500 of FIG. 5A may be included in the UFS device 200 in FIG. 2.

Referring to FIG. 5A and FIG. 2, the lane merging circuit 500 may include a receiving amplifier 510, a CDR circuit 520 (clock data recovery circuit), an 8 bit/10 bit decoder 530, a RMMI 540 (reference M-PHY module interface), a buffer 550, a descrambler 560, a marker and skip symbol erasing circuit 570, a lane merging circuit 580, and a symbol translating circuit 590.

The receiving amplifier 510 may receive data symbols from the UFS device 200, and the CDR circuit 520 may recover the received data symbols based on a reference clock signal or a receiving clock signal. The 8 bit/10 bit decoder 530 may decode a 10-bit received data symbol into an 8-bit data symbol, and the RMMI 540 may perform interfacing between a physical layer and a 1.5 layer. The physical layer includes the receiving amplifier 510, the CDR circuit 520, and the 8 bit/10 bit decoder 530, and the 1.5 layer includes the buffer 550, the descrambler 560, and the symbol translating circuit 590. The descrambler 560 may obtain an original data symbol by performing inverse translation of a scrambling operation performed during the transmission of a data symbol. The marker and skip symbol erasing circuit 570 may obtain a data symbol corresponding to only read data by removing an added marker and/or skip symbol other than a symbol for the read data. Thereafter, the lane merging circuit 580 may receive 8-bit data symbols from each of three transmission lanes, merge the received data symbols, and decode the read data by using the symbol translating circuit 590. The lane merging circuit 580 may merge data symbols received via at least two bidirectional UFS lanes into one symbols stream.

According to various embodiments, when both the bidirectional lanes 410-1 and 410-2 are in a transmission mode, the lane merging circuit 500 may be simultaneously connected to receiving amplifiers of the UFS device 200. When both the bidirectional lanes 410-1 and 410-2 are in a transmission mode, the lane merging circuit 500 may merge and receive write data which is received via the first transmission lane 310-1 and the bidirectional lanes 410-1 and 410-2 from the UFS host 100.

According to various embodiments, when both the bidirectional lanes 410-1 and 410-2 are in a receiving mode, the lane merging circuit 500 may be simultaneously connected to receiving amplifiers of the UFS host 100. When both the bidirectional lanes 410-1 and 410-2 are in a receiving mode, the lane merging circuit 500 may and merge and receive read data which is received via the first receiving lane 320-1 and the bidirectional lanes 410-1 and 410-2 from the UFS device 200.

Figure 5B:
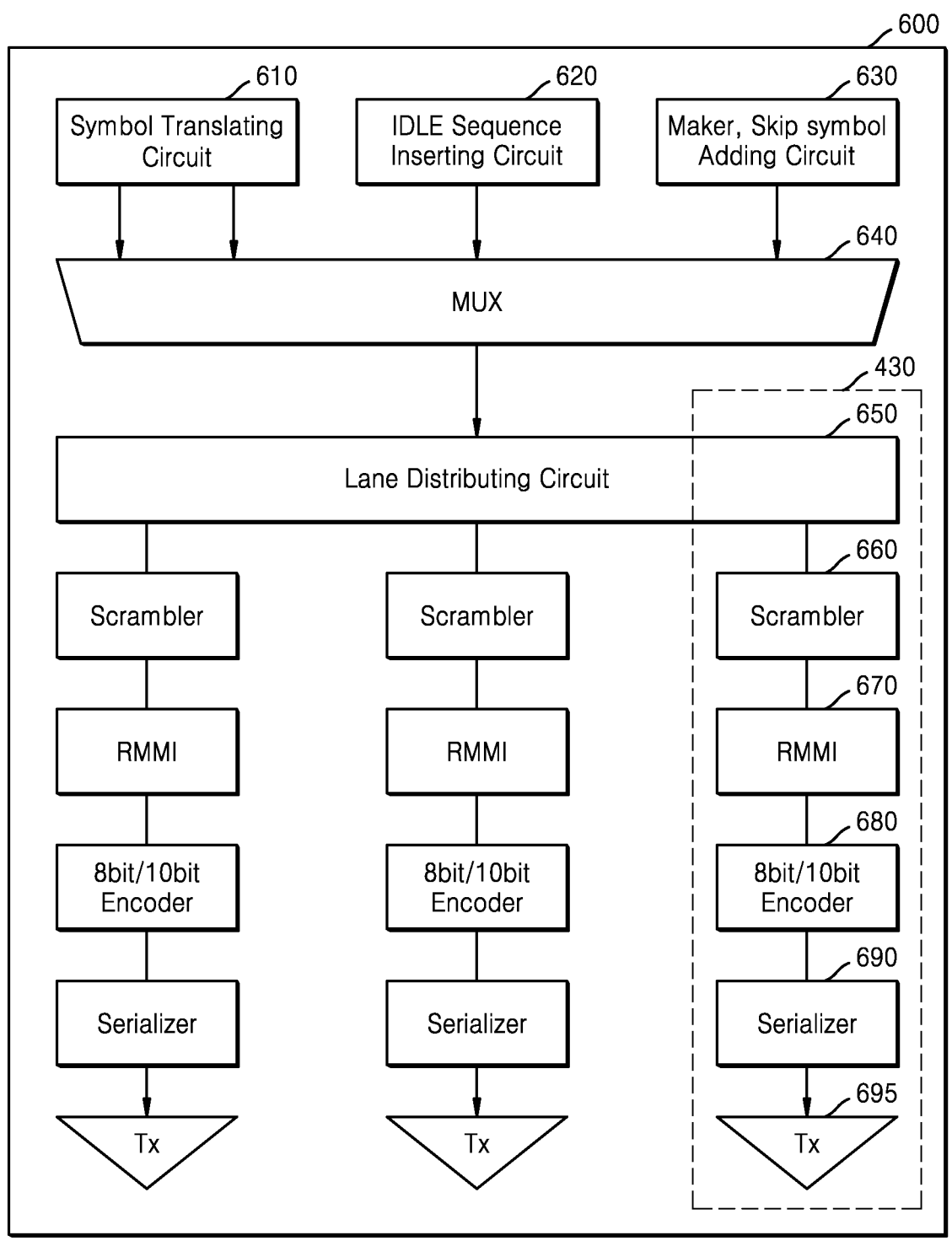
FIG. 5B is a block diagram illustrating a distributing circuit according to an example embodiment.

FIG. 5B is a block diagram illustrating a distributing circuit 600 according to an example embodiment.

The distributing circuit 600 of FIG. 5B may include at least the distributing circuit 430 of FIG. 4B. For brevity, hereinafter, the distributing circuit 600 of FIG. 5B may be assumed to distribute write data to three transmission lanes and that the distributing circuit 600 is included in the UFS host 100 in FIG. 2. Alternatively, the distributing circuit 600 of FIG. 5B may be included in the UFS device 200 in FIG. 2.

Referring to FIG. 5B, the distributing circuit 600 may include a symbol translating circuit 610, an idle sequence inserting circuit 620, a marker and skip symbol adding circuit 630, a MUX 640 (multiplexer), a lane distributing circuit 650, a scrambler 660, an RMMI 670, an 8 bit/10 bit encoder 680, a serializer 690, and a transmission amplifier 695.

The symbol translating circuit 610 may receive write data from the UFS driver 130 and perform a symbol translation operation on the received write data. Thus, a transmission symbol may be obtained. The idle sequence inserting circuit 620 may insert an idle sequence based on a low-power mode. For example, when there is a low need to use all of three lanes as the transmission lanes because of a small amount of write data, only symbols of the idle sequence may be inserted into one of bidirectional lanes 410-1 and 410-2. Accordingly, unnecessary power consumption may be prevented by reducing the number of transmission lanes used. The marker and skip symbol adding circuit 630 may correspond to a circuit configured to add a marker and/or a skip symbol to a symbol for write data. By inserting the marker or the skip symbol to the symbol for write data, a robustness against an error that may occur during a transceiving process may be acquired.

According to an embodiment, when a translated symbol for write data has 17 bits, the number of symbols input into the MUX 640 may correspond to 24. The MUX 640 and the lane distributing circuit 650 may be used to uniformly distribute an 8-bit transmission symbol to each of the three transmission lanes. Thus, the lane distributing circuit 650 may be configured to divide one symbol stream into uniform data symbols via at least two bidirectional UFS lanes. The lane distributing circuit 650 may be configured to uniformly distribute data symbols output to the UFS host 100 via UFS lanes for a first direction, from among the bidirectional UFS lanes. Subsequently, the scrambler 660 may scramble the 8-bit symbol received from each lane by performing an XOR operation on the received 8-bit symbol. The 8 bit/10 bit encoder 680 may encode the scrambled 8-bit symbol into a 10-bit symbol and may transmit the 10-bit symbol to the UFS device 200 via the serializer 690 by serial communication.

Figure 5C:
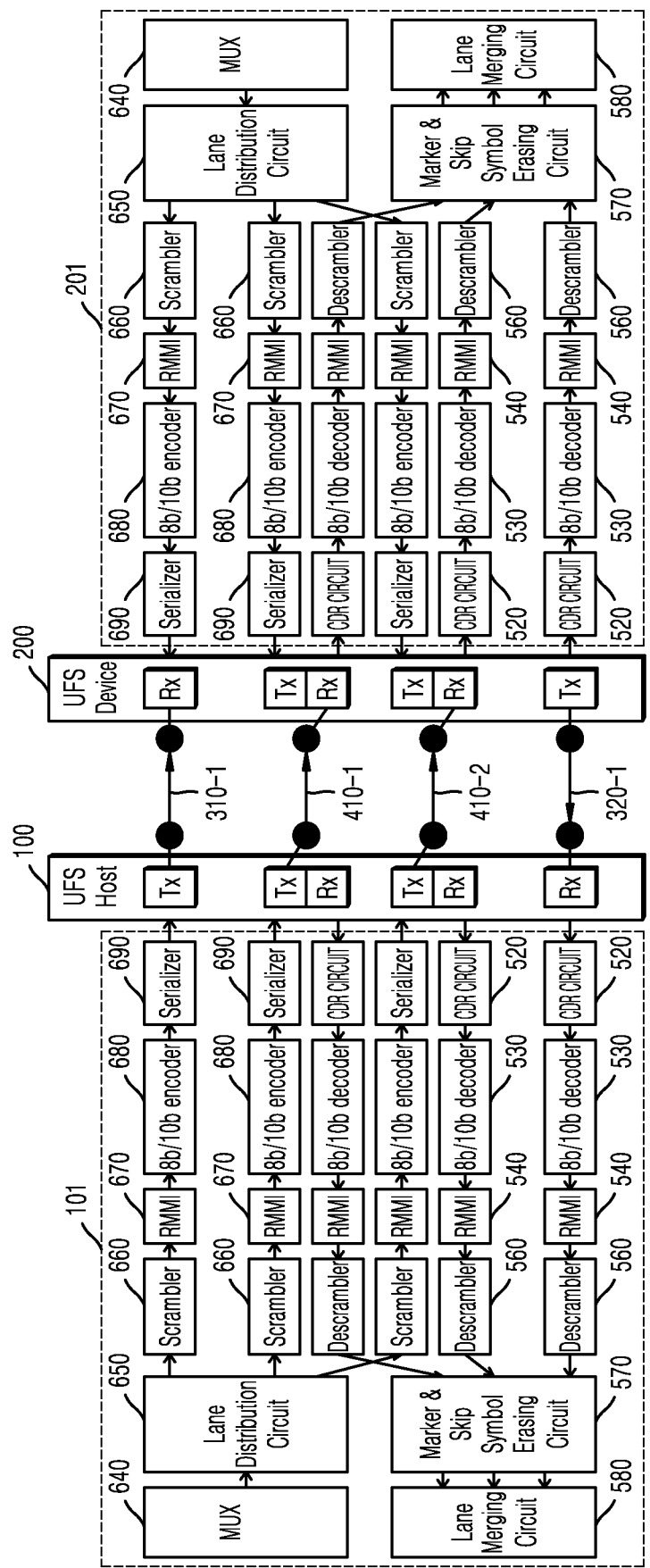
FIG. 5C is a block diagram illustrating a UFS system according to an example embodiment.

FIG. 5C is a block diagram illustrating a UFS system according to an example embodiment.

In FIG. 5C, the UFS host 100 and the UFS device are connected by bidirectional lanes 410-1 and 410-2, by first transmission lane 310-1 and by first receiving lane 320-1. The UFS host 100 may include some or all elements to the left of the UFS host 100 label in FIG. 5C. The UFS device 200 may include some or all elements to the right of the UFS device 200 label in FIG. 5C. The elements to the left of the UFS host 100 in FIG. 5C may comprise an interface circuit configured to connect the UFS data lane(s) to the UFS host controller 120 in FIG. 2, such as via the UIC layer 110 in FIG. 2. The elements to the right of the UFS device 200 in FIG. 5C may comprise an interface circuit configured to connect the UFS data lane(s) to the UFS device controller 220 in FIG. 2, such as via the UIC layer 210 in FIG. 2. As indicated, an interface 101 may therefore be fully or partially part of the UFS host 100, or may be an entirely separate interface that interfaces the UFS host 100. Also as indicated, the interface 201 may therefore be fully or partially part of the UFS device 200, or may be an entirely separate interface that interfaces the UFS device 200.

The UFS host 100 is provided with inputs from elements of the distributing circuit 600 from FIG. 5B including a MUX 640 (multiplexer), a lane distributing circuit 650, three instances of a scrambler 660, three instances of an RMMI 670, three instances of an 8 bit/10 bit encoder 680, and three instances of a serializer 690. The UFS host 100 provides outputs to elements of the lane merging circuit 500 including three instances of a CDR circuit 520 (clock data recovery circuit), three instance of an 8 bit/10 bit decoder 530, three instance of an RMMI 540 (reference M-PHY module interface), three instances of a descrambler 560, a marker and skip symbol erasing circuit 570 and a lane merging circuit 580.

The UFS device 200 in FIG. 5C is also provided with inputs from elements of the distributing circuit 600 from FIG. 5B, including a MUX 640 (multiplexer), a lane distributing circuit 650, three instances of a scrambler 660, three instances of an RMMI 670, three instances of an 8 bit/10 bit encoder 680, and three instances of a serializer 690. The UFS host 100 in FIG. 5C also provides outputs to elements of the lane merging circuit 500 including three instances of a CDR circuit 520 (clock data recovery circuit), three instance of an 8 bit/10 bit decoder 530, three instance of an RMMI 540 (reference M-PHY module interface), three instances of a descrambler 560, a marker and skip symbol erasing circuit 570 and a lane merging circuit 580.

Figure 6:
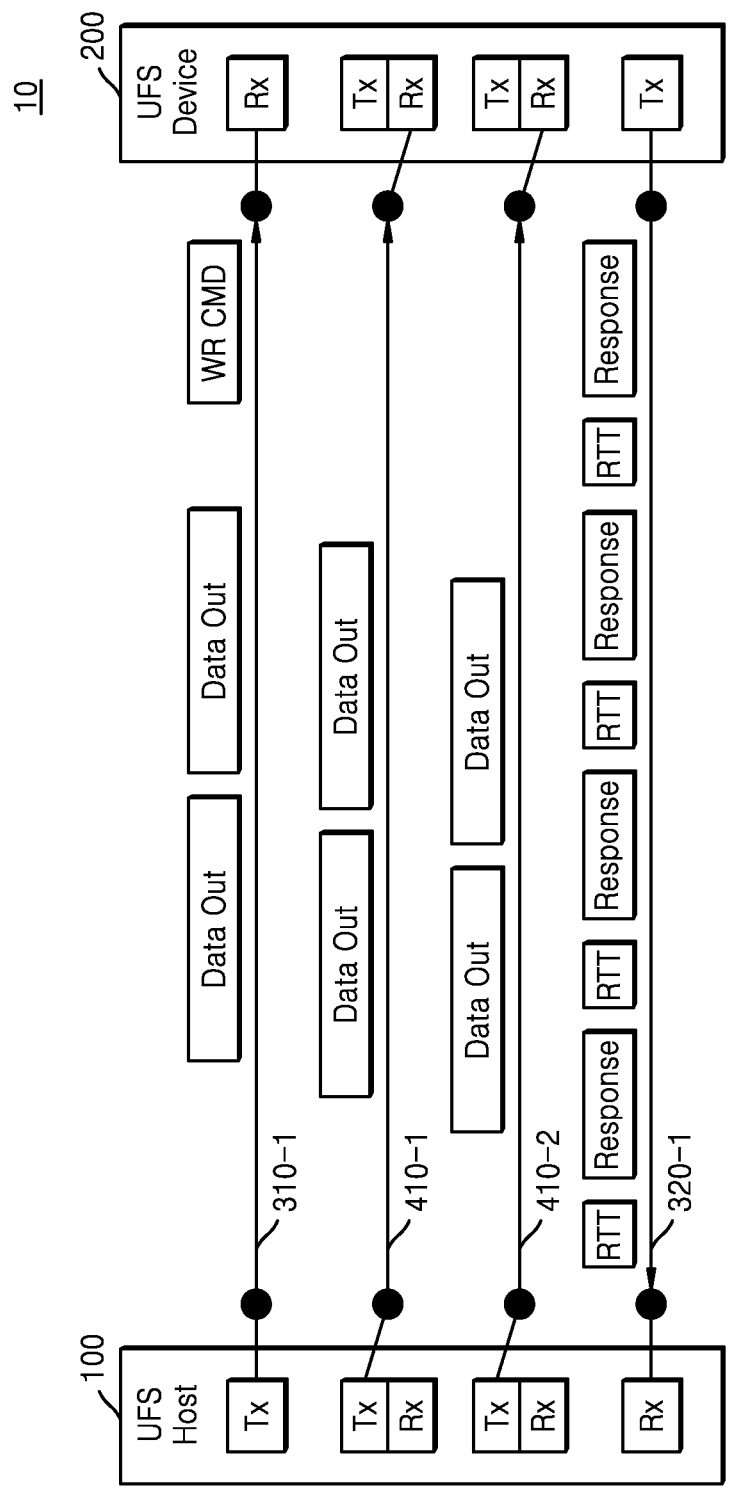
FIG. 6 illustrates data flow when a UFS host is in a high-performance write mode in a UFS system according to an example embodiment.

FIG. 6 illustrates data flow when a UFS host is in a high-performance write mode in a UFS system according to an example embodiment Referring to FIG. 6, a UFS host 100 may operate in a high-performance write mode. The high-performance write mode may be a mode that the UFS host 100 enters when the speed of transmitting data to the UFS device 200 is reduced due to a large size of write data. That is, when the UFS host 100 enters the high-performance write mode, the UFS host 100 may increase a bandwidth for transmitting data to the UFS device 200 by switching all bidirectional lanes 410-1 and 410-2 to transmission lanes. That is, the UFS host 100 may transmit write data via three lanes, that is, a first transmission lane 310-1 and bidirectional lanes 410-1 and 410-2.

Referring to FIG. 6, the UFS host 100 may transmit a write command to the UFS device 200 via the first transmission lane 310-1. Communication information, such as the write command or a read command, may be transmitted to the UFS device 200 via a unidirectional transmission lane, without being limited thereto. According to various embodiments, the command information may be transmitted to the UFS device 200 via any one of the bidirectional lanes 410-1 and 410-2.

The UFS host 100 may transmit write data to the UFS device 200 in parallel via the first transmission lane 310-1 and the bidirectional lanes 410-1 and 410-2 in response to the receiving of an RTT from the UFS device 200. Assuming that the total number of pieces of partial data of write data to be transmitted to the UFS device 200 is 6, because the UFS host 100 operates three transmission lanes, the transmission of write data may be completed by performing a transmission operation twice by using each lane. Contrarily, when the UFS host 100 does not operate in the high-performance write mode but uses two unidirectional transmission lanes, the UFS host 100 may have to perform a data transmission operation three times to transmit all of the 6 pieces of partial data of write data. Thus, it can be seen that transmission speed may be reduced.

Figure 7:
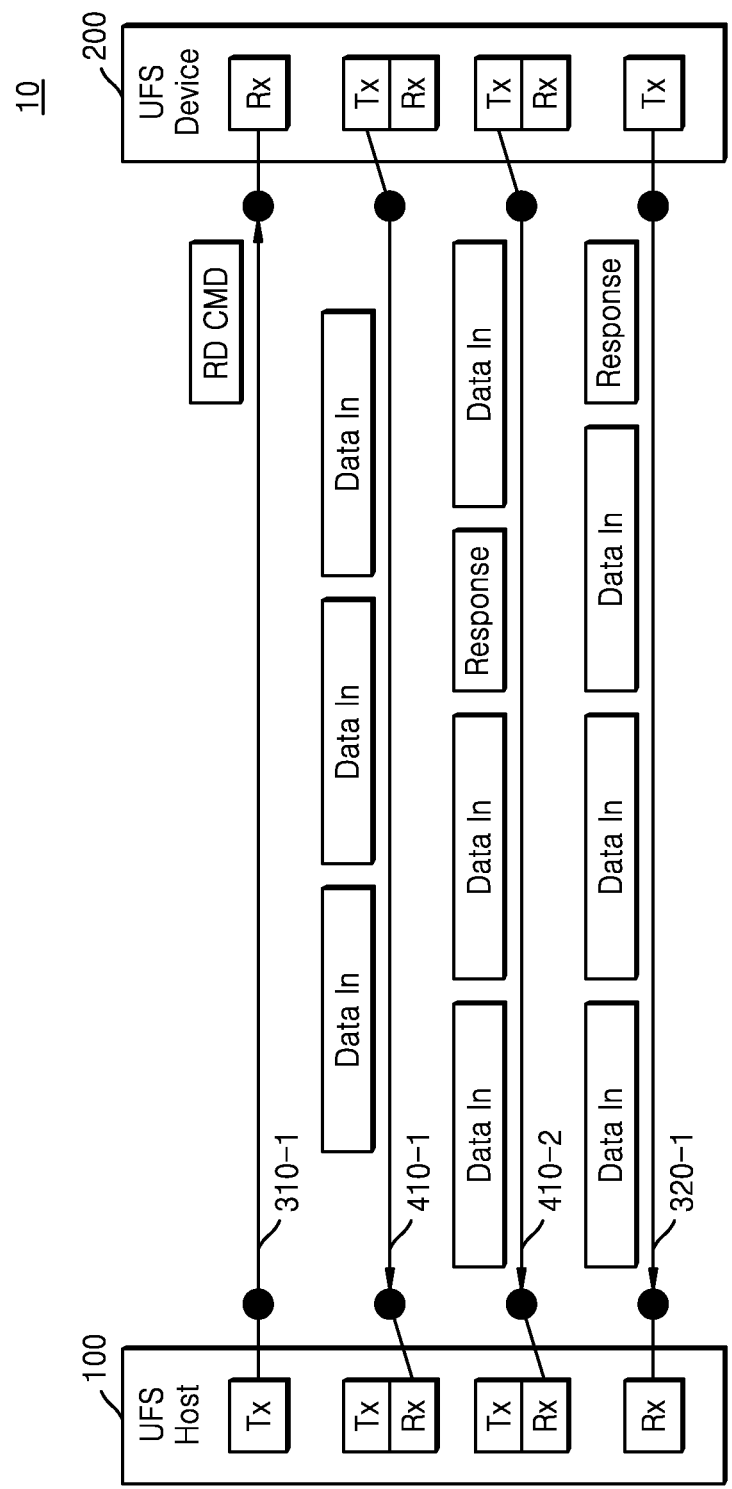
FIG. 7 illustrates data flow when a UFS host is in a high-performance read mode in a UFS system according to an example embodiment.

FIG. 7 illustrates data flow when a UFS host is in a high-performance read mode in a UFS system according to an example embodiment.

Referring to FIG. 7, the UFS host 100 may operate in a high-performance read mode. The high-performance read mode may be a mode that the UFS host 100 enters when the speed of receiving read data from the UFS device 200 is saturated due to a large size of read data. That is, when the UFS host 100 enters the high-performance read mode, the UFS host 100 may increase a receiving bandwidth for transmitting data received from the UFS device 200 by switching all bidirectional lanes 410-1 and 410-2 to receiving lanes. That is, the UFS host 100 may transmit write data via three lanes, that is, a first receiving lane 320-1 and bidirectional lanes 410-1 and 410-2.

Referring to FIG. 7, the UFS host 100 may transmit a read command to the UFS device 200 via a first transmission lane 310-1. Command information, such as a write command or the read command, may be transmitted to the UFS device 200 via a unidirectional transmission lane, without being limited thereto. According to various embodiments, the command information may be transmitted to the UFS device 200 via any one of the bidirectional lanes 410-1 and 410-2.

The UFS device 200 may transmit read data to the UFS host 100 in parallel via the first receiving lane 320-1 and the bidirectional lanes 410-1 and 410-2 in response to the receiving of the read command from the UFS host 100. Assuming that the total number of pieces of partial data of read data to be received by the UFS host 100 is 6, because the UFS host 100 operates three receiving lanes, the receiving of read data may be completed by performing a receiving operation twice by using each lane. Contrarily, when the UFS host 100 does not operate in the high-performance read mode but uses two unidirectional receiving lanes, the UFS host 100 may have to perform a data receiving operation three times to receive all of the 6 pieces of partial data corresponding to read data. Thus, it can be seen that receiving speed may be reduced.

Figure 8:
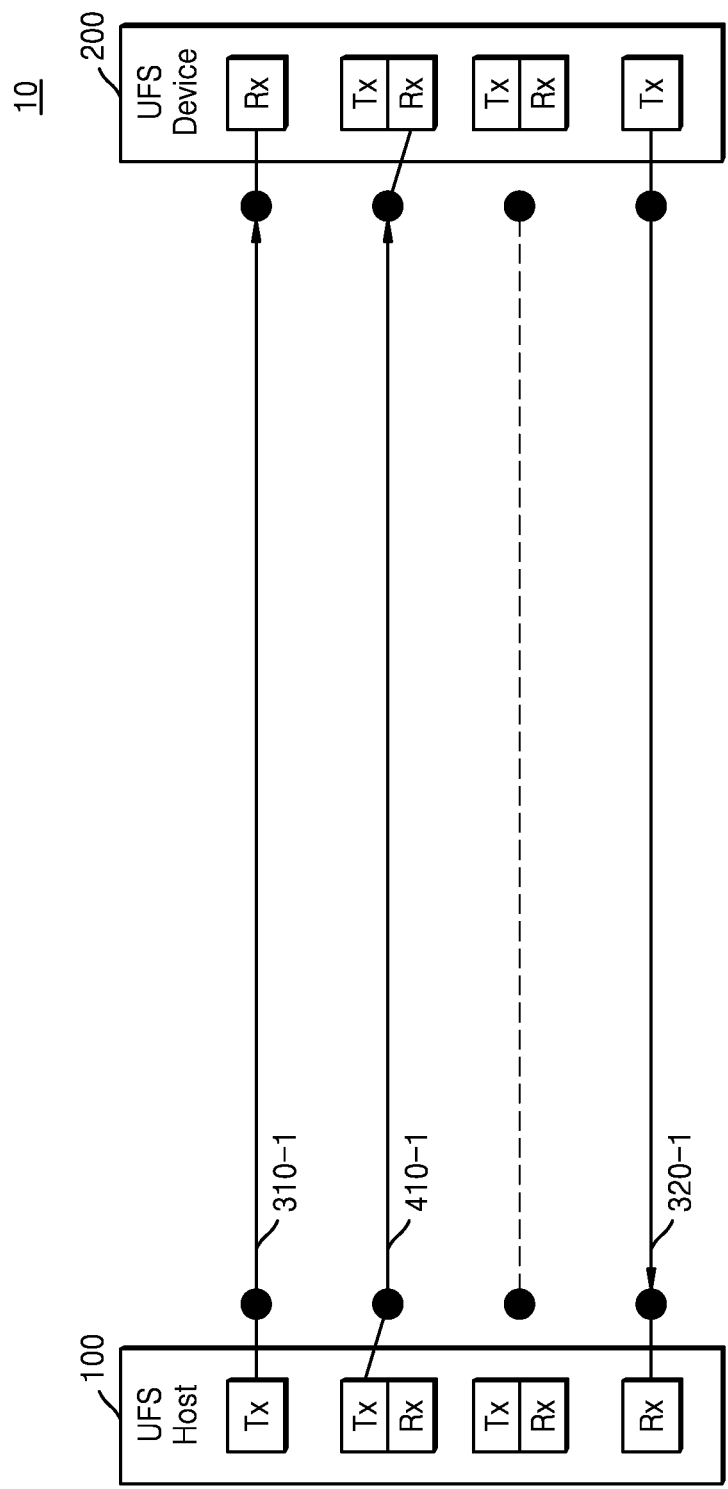
FIG. 8 illustrates data flow when a UFS host is in a low-power mode in a UFS system according to an example embodiment.

FIG. 8 illustrates data flow when a UFS host is in a low-power mode in a UFS system according to an example embodiment. FIG. 8 will be described with reference to FIG. 5A and FIG. 5B.

Referring to FIG. 8, the UFS host 100 may operate in a low-power mode. The low-power mode may refer to a mode in which, due to a small size of read data or write data, there is no need to use three receiving lanes to receive read data from the UFS device 200 or there is no need to use three transmission lanes to transmit write data to the UFS device 200.

That is, when the UFS host 100 enters the low-power mode, the UFS host 100 may deactivate some lanes of the bidirectional lanes 410-1 and 410-2. For example, when the size of write data is less than a predefined size, the UFS host 100 may transmit the write data to the UFS device 200 by using only a first transmission lane 310-1 or transmit the write data by using two transmission lanes, that is, one of the bidirectional lanes 410-1 and 410-2 and the first transmission lane 310-1.

According to various embodiments, the deactivated lane may refer to a lane which is not related to data transmission/receiving operations such that power is cut off. For example, when at least one bidirectional lane which is in a transmission mode is deactivated, the UFS host 100 may cut off power from the lane distributing circuit 650 of the bidirectional lane that is determined to be deactivated. That is, when the bidirectional lane which is in the transmission mode is deactivated, the lane distributing circuit 650, the scrambler 660, the RMMI 670, the 8 bit/10 bit encoder 680, the serializer 690, and the transmission amplifier 695 may be powered off.

As another example, when at least one bidirectional lane which operates in a receiving mode is deactivated, the UFS host 100 may cut off power from an analog frontend to the lane merging circuit 580. That is, when the bidirectional lane which is in the receiving mode is deactivated, the receiving amplifier 510, the CDR circuit 520, the 8 bit/10 bit decoder 530, the RMMI 540, the buffer 550, the descrambler 560, the marker and skip symbol erasing circuit 570, and the lane merging circuit 580 may be powered off.

Figure 9:
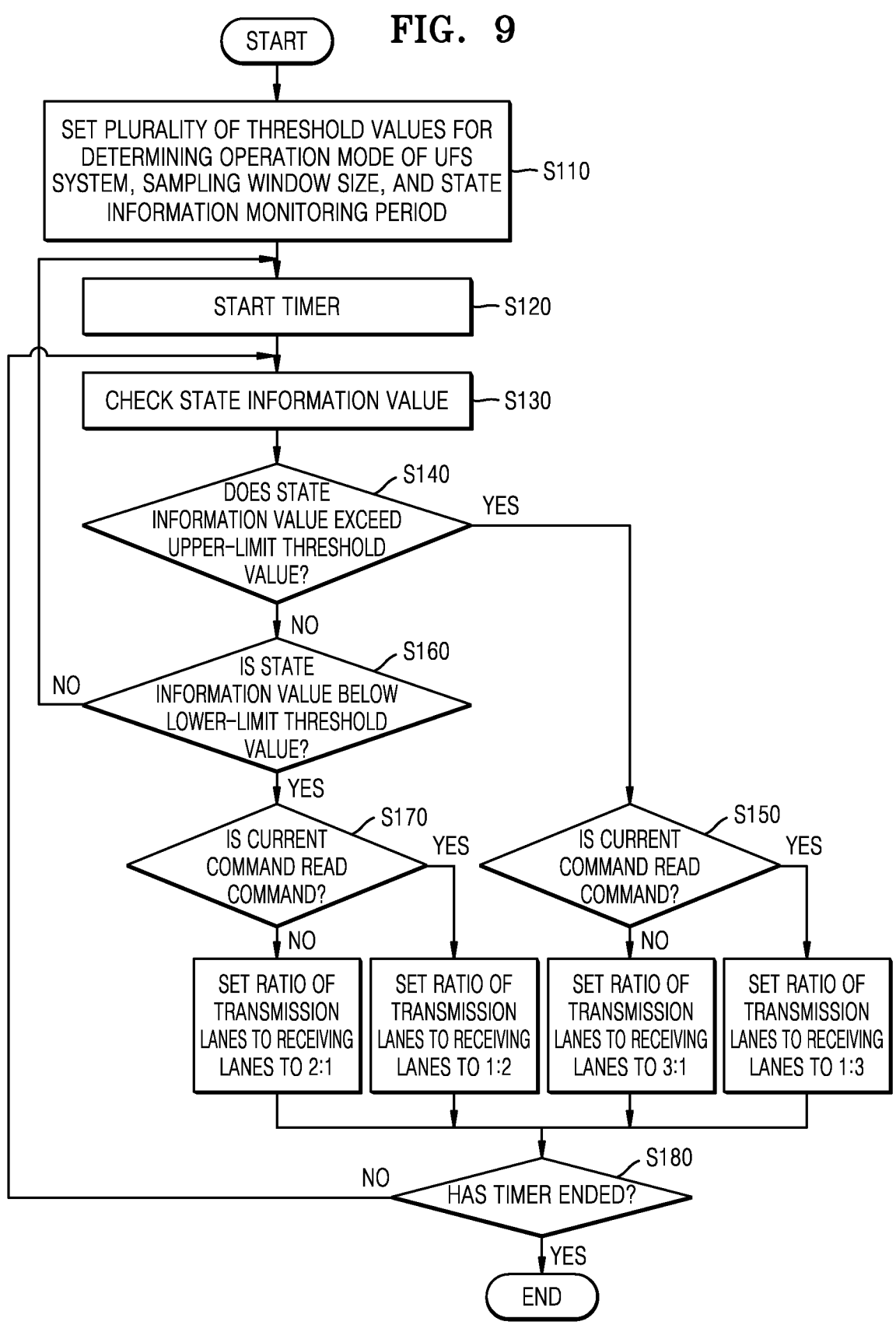
FIG. 9 is a flowchart illustrating an operation of a UFS system according to an example embodiment.

FIG. 9 is a flowchart illustrating an operation of a UFS system according to an example embodiment. FIG. 9 will be described with reference to FIG. 2 and FIG. 4A.

Referring to FIG. 9, in operation S110, the UFS host 100 or the UFS device 200 may set a plurality of threshold values for determining an operation mode of the UFS system 10, a sampling window size, and a state information monitoring period. The plurality of threshold values for determining the operation mode may include a write upper-limit threshold value, a read upper-limit threshold value, and lower-limit threshold values. As an example, the UFS host 100 may detect a size of data transmitted to the UFS device 200 and a size of data received from the UFS device 200, based on the application 150, compare the sizes of data with the plurality of threshold values, and determine the operation mode. As another example, the UFS device 200 may detect a size of data received from the UFS host 100 and a size of data transmitted to the UFS host 100, based on the data flow analysis module 222 of the UFS device controller 220, compare the sizes of data with the plurality of threshold values, and determine the operation mode. Alternatively, the UFS host 100 may receive a request for data flow analysis information from the data flow analysis module 222 of the UFS device controller 220 and may transmit information about a ratio between the sizes of data transmitted and received between the UFS host 100 and the UFS device 200 to the data flow analysis module 222.

The write upper-limit threshold value may refer to a threshold value for preventing a reduction in transmission speed, which may occur when a size of write data requested by the UFS host 100 is excessively large. For example, when a state information value to be described below exceeds the write upper-limit threshold value, the UFS host 100 may switch bidirectional lanes 410-1 and 410-2 to a transmission mode to increase speed at which write data is transmitted to the UFS device 200.

The read upper-limit threshold value may refer to a threshold value for preventing a reduction in receiving speed, which may occur when a size of read data received by the UFS host 100 is excessively large. For example, when the state information value to be described below exceeds the read upper-limit threshold value, the UFS host 100 may switch the bidirectional lanes 410-1 and 410-2 to a receiving mode to increase the speed of receiving read data from the UFS device 200.

The lower-limit threshold value may refer to a threshold value that does not require activating all of the bidirectional lanes 410-1 and 410-2 due to an excessively small size of read data or write data. That is, the lower-limit threshold value may correspond to a value for determining whether the UFS system 10 is to enter a low-power mode. For example, when the state information value to be described below is less than the lower-limit threshold value, the UFS host 100 may deactivate at least one of the bidirectional lanes 410-1 and 410-2.

The sampling window size may refer to a unit size for sampling read data or write data. The state information monitoring period may refer to a value for determining a frequency at which the operation mode is to be changed by receiving the state information value. For example, the state information monitoring period may be about 40 ms, without being limited thereto. As the state information monitoring period is reduced, the operation mode may be efficiently changed in fast response to the flow of transceiving data between the UFS host 100 and the UFS device 200. However, the amount of monitoring may be excessively increased simultaneously, and thus, overall efficiency of the UFS system 10 may be reduced.

In operation S120, the UFS host 100 or the UFS device 200 may start a timer. A value of the timer may refer to the state information monitoring period described above. For example, when the state information monitoring period is about 40 ms, the UFS host 100 may receive the state information value from the application 150 at periods of about 40 ms and reset the timer. For example, when the state information monitoring period is about 40 ms, the data flow analysis module 222 of the UFS device controller 220 may generate state information at periods of about 40 ms or request data flow analysis information from the application 150 of the UFS host 100.

In operation S130, the UFS host 100 or the UFS device 200 may check the state information value. The state information value may indicate the amount of data that is being transceived via transmission/receiving lanes of the UFS system 10. For example, the state information may be represented by a specific value and expressed in units of %. That is, the state information may indicate an extent to which the transmission/receiving lanes of the UFS system 10 are occupied by read data or write data. For example, when a size of write data to be transmitted by the UFS host 100 to the UFS device 200 is large, the UFS host 100 may continuously transmit write data to the UFS device 200 via first transmission lanes 310-1. Accordingly, a ratio of the first transmission lane 310-1 occupied by write data that is being transmitted to the UFS device 200 may increase. It may be inferred that as the size of state information increases, the transmission lane or the receiving lane is occupied by data to a larger extent, and thus, the transmission speed is saturated.

In operation S140, the UFS host 100 or the UFS device 200 may compare the received state information value with the upper-limit threshold value. The state information may include a ratio of an entire transmission lane to the size of the output data being transmitted via the entire transmission lane, or a load ratio of an entire receiving lane to the size of input data being received via the entire receiving lane. As an example, when a state information value which indicates a ratio of transmission/receiving lanes currently occupied by data is 80 and the upper-limit threshold value is 70, the UFS host 100 may determine that a transceiving speed of data is currently saturated and the congestion of data occurs on the transmission/receiving lanes based on the saturation of transmission speed. Thus, the UFS host 100 may perform operation S150. As another example, when a state information value which indicates a ratio of transmission/receiving lanes currently occupied by data is 50 and the upper-limit threshold value is 70, the UFS host 100 may determine that a transceiving speed of data is currently not saturated based on the absence of saturation of receiving speed.

In operation S150, the UFS host 100 may determine a type of command transmitted to the UFS device 200. That is, when the present state information value exceeds the upper-limit threshold value in operation S140, a mode to which the bidirectional lanes 410-1 and 410-2 are to be switched may be determined depending on whether the command transmitted to the UFS device 200 is a read command or a write command. As a result, the UFS host controller 120 or the UFS device controller 220 is configured to switch the at least one bidirectional lane to a transmission mode and output transmission data via the at least one bidirectional lane together with the transmission lane when the state information exceeds a first upper-limit threshold value.

As an example, when the main processor 1100 of a UFS host 100 is an application processor (e.g., including the UFS host controller 120 of the UFS host 100), the application processor may determine an operation mode based on the state information, and may transmit a control signal indicating the operation mode to the UFS device 200. The state information may include a first ratio and/or a second ratio, wherein the first ratio indicates a load ratio of UFS lanes for the first direction to a size of read data transmitted from the UFS device to the UFS host, and the second ratio indicates a load ratio of UFS lanes for the second direction to a size of write data transmitted from the UFS host to the UFS device. The application processor of the UFS host 100 may compare the state information with a plurality of threshold values and determine an operation mode of bidirectional UFS lanes based on state information. The plurality of threshold values may comprise a read upper-limit threshold value at which a receiving speed is saturated when the read data is received via the UFS lanes for the first direction, a write upper-limit threshold value at which a transmission speed is saturated when the write data is transmitted via UFS lanes for the second direction, and a lower-limit threshold value at which the saturation of the receiving speed or the saturation of the transmission speed does not occur even when at least some of the bidirectional UFS lanes are deactivated. The application processor of the UFS host 100 may switch at least some UFS lanes of the bidirectional UFS lanes according to a first operation mode to transmit data in the first direction when the first ratio included in the state information exceeds the read upper-limit threshold value, switch at least some UFS lanes of the bidirectional UFS lanes according to a second operation mode to transmit data in the second direction when the second ratio included in the state information exceeds the write upper-limit threshold value, and deactivate at least some UFS lanes of the bidirectional UFS lanes according to a third operation mode when each of the first ratio and the second ratio is less than the lower-limit threshold value.

As an example, when the command transmitted to the UFS device 200 is the read command, it can be seen that the congestion of read data received from the UFS device 200 occurs on transmission/receiving lanes of the UFS system 10. Accordingly, to resolve the congestion, the UFS host 100 may transmit, to the UFS device 200, a control signal for switching the mode of the bidirectional lanes 410-1 and 410-2 to the receiving mode. The UFS device controller 220 may identify the operation mode based on the control signal received from the UFS host 100, and control a plurality of switching circuits to activate any one of the lane distributing circuit 650 and the lane merging circuit 580 according to the identified operation mode. The UFS device controller 220 outputs transmission data in the transmitting mode and receives reception data in the receiving mode. When the bidirectional lanes 410-1 and 410-2 are switched to the receiving mode, the number of receiving lanes of the UFS system 10 may be increased to 3. Thus, because a receiving bandwidth is increased by about 1.5 times, the speed of receiving read data may also be increased, and thus, the congestion of data on the transmission/receiving lanes may be resolved.

As another example, when the command transmitted to the UFS device 200 is the write command, it can be seen that the congestion of write data transmitted to the UFS device 200 occurs on the transmission/receiving lanes of the UFS system 10. Accordingly, to resolve the congestion, the UFS host 100 may transmit, to the UFS device 200, a control signal for switching a mode of the bidirectional lanes 410-1 and 410-2 to the transmission mode. When the bidirectional lanes 410-1 and 410-2 are switched to the transmission mode, the number of transmission lanes of the UFS system 10 may be increased to 3. Accordingly, because a transmission bandwidth is increased by about 1.5 times, the speed of transmitting the write data may also be increased, and thus, the congestion of the write data on the transmission/receiving lanes may be resolved. After operation S150, the congestion of data may be resolved by setting a ratio of transmission lanes to receiving lanes to 3:1 or 1:3. Thereafter, in operation S180, the UFS device 200 may determine whether the timer has ended. When the timer has not ended, the UFS device 200 may check a state information value by repeating operation S130, and adaptively change a ratio between transmission lanes and receiving lanes. When the timer has ended, the UFS device 200 may terminate the procedure.

In operation S160, the UFS host 100 or the UFS device 200 may determine whether the received state information value is less than the lower-limit threshold value. When the state information value is less than the lower-limit threshold value, the UFS host 100 may not need to activate all of the bidirectional lanes 410-1 and 410-2.

As an example, when the state information value is less than the lower-limit threshold value, the UFS host 100 or the UFS device 200 may deactivate at least some of the bidirectional lanes 410-1 and 410-2. Thereafter, operation S170 may be performed to determine an operation mode of the remaining lanes that remain active, from among the bidirectional lanes 410-1 and 410-2.

As another example, when the state information value is greater than the lower-limit threshold value, the UFS host 100 or the UFS device 200 may terminate the procedure. Because the size of data currently transmitted and receive is less than the upper-limit threshold value and greater than the lower-limit threshold value, a condition where the number of transmission lanes is equal to the number of receiving lanes may be maintained.

In operation S170, the UFS host 100 may determine a type of a command transmitted to the UFS device 200. That is, because the present state information value is less than the lower-limit threshold value in operation S160, a mode to which some lanes that remain active, from among the bidirectional lanes 410-1 and 410-2, are to be switched may be determined depending on whether the command transmitted to the UFS device 200 is a read command or a write command.

As an example, when the command transmitted to the UFS device 200 is the read command, the UFS host 100 or the UFS device 200 may control the UIC layer 110 or the UIC layer 210, to switch the mode of some lanes that remain active, from among the bidirectional lanes 410-1 and 410-2, to the receiving mode. Accordingly, the number of receiving lanes of the UFS system 10 may be 2. Because, the at least some of the bidirectional lanes 410-1 and 410-2 remains being deactivated in operation S160, power consumption may be reduced.

As another example, when the command transmitted to the UFS device 200 is the write command, the UFS host 100 or the UFS device 200 may be controlled to switch the mode of some lanes that remain active, from among the bidirectional lanes 410-1 and 410-2, to the transmission mode. Accordingly, the number of transmission lanes of the UFS system 10 may be 2, and all of the bidirectional lanes 410-1 and 410-2 may not remain active, and thus, power consumption may be reduced. After operation S170, when the congestion of data is resolved by setting a ratio of transmission lanes to receiving lanes to 2:1 or 1:2, the UFS device 200 may determine whether the time has ended in operation S180. When the timer has not ended, the UFS device 200 may check a state information value by repeating operation S130, and adaptively change a ratio between transmission lanes and receiving lanes. When the timer has ended, the UFS device 200 may terminate the procedure.

Figure 10A:
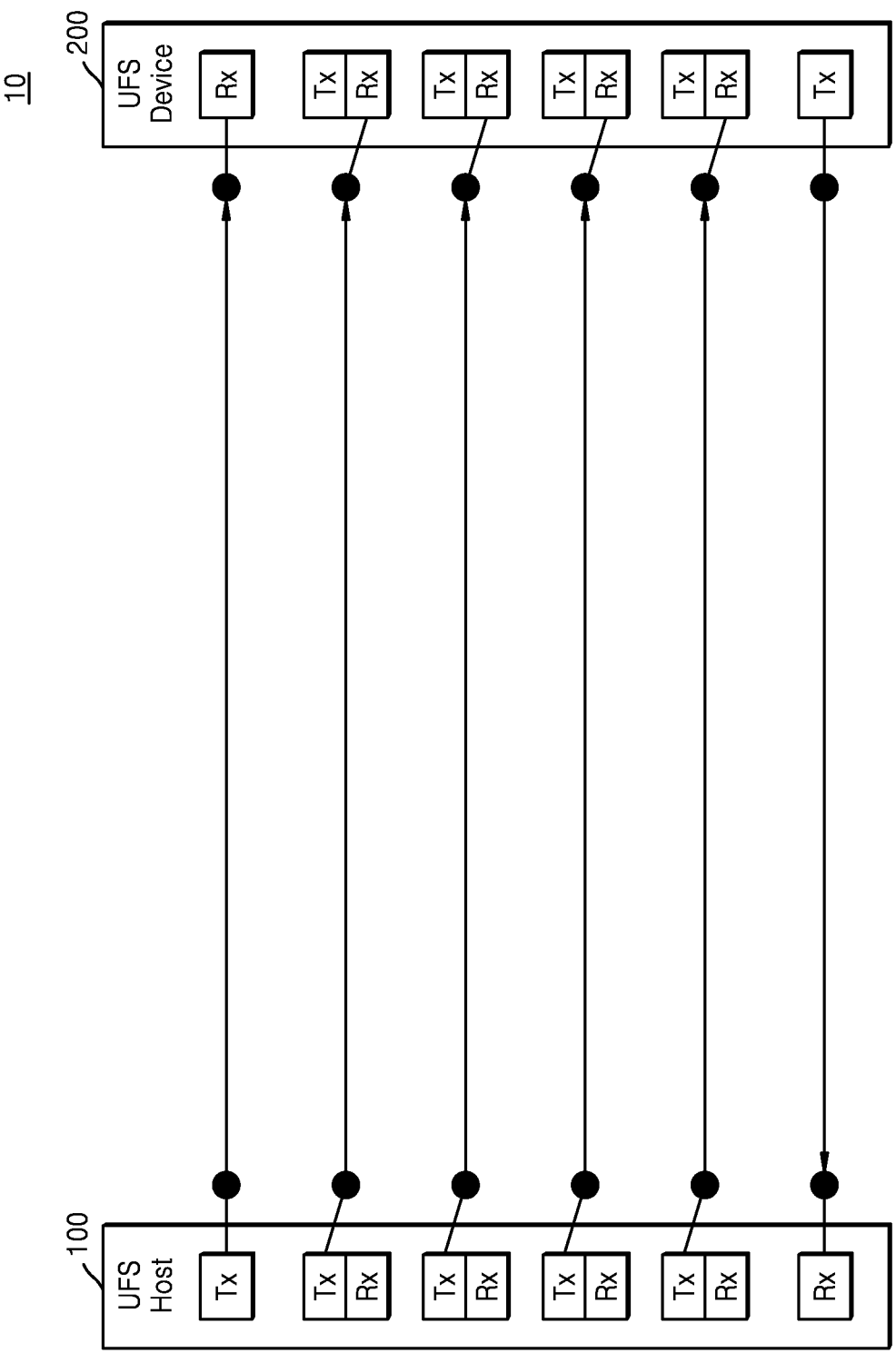
Figure 10B:
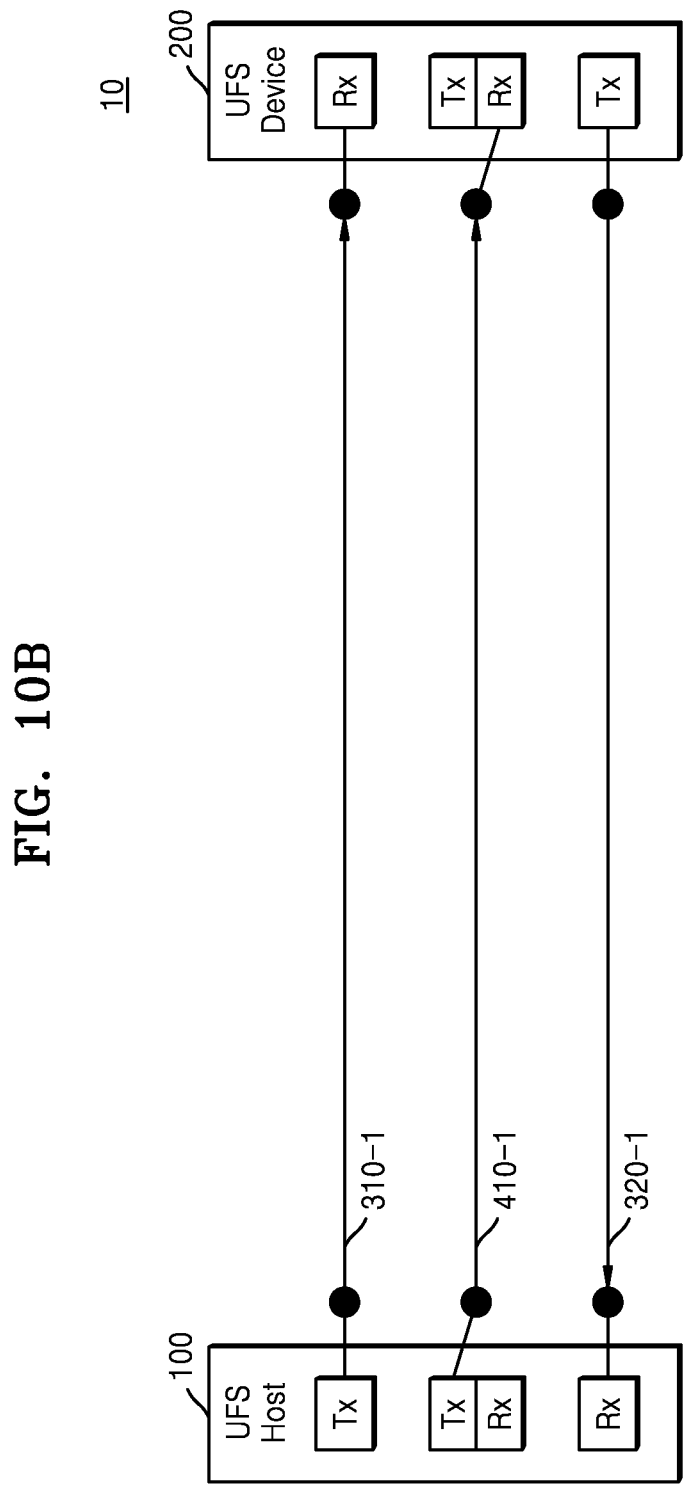

FIG. 10A, FIG. 10B and FIG. 10C respectively illustrate examples of various asymmetric lanes according to example embodiments. FIG. 10A, FIG. 10B and FIG. 10C will be described with reference to FIG. 5A and FIG. 5B.

Referring to FIG. 10A, a UFS system 10 may include one first transmission lane 310-1, one first receiving lane 320-1, and four bidirectional lanes. The UFS system 10 of FIG. 10A may further include at least two instances of the lane merging circuit 500 as at least two lane merging circuits and at least two instances of the distributing circuit 600 as at least two lane distributing circuits. In an embodiment, all of the four bidirectional lanes may be switched to transmission lanes. When all of the bidirectional lanes are switched to the transmission lanes, a UFS host 100 may perform a data transmission operation via five transmission lanes by using the at least two lane distributing circuits. In another embodiment, all of the four bidirectional lanes may be switched to receiving lanes. When all of the four bidirectional lanes are switched to the receiving lanes, the UFS host 100 may perform a data receiving operation via five receiving lanes by using the at least two instances of the lane merging circuit 500.

Referring to FIG. 10B, a UFS system 10 may include one first transmission lane 310-1, one first receiving lane 320-1, and one bidirectional lane. The UFS system 10 of FIG. 10B may include a lane merging circuit and a lane distributing circuit. However, the lane merging circuit 500 shown in FIG. 5A may be used to merge symbols received via three receiving lanes. The lane merging circuit of FIG. 10B may correspond to a circuit configured to merge symbols received via two receiving lanes. Similarly, the lane distributing circuit of FIG. 10B may correspond to a circuit configured to uniformly distribute transmission symbols via two transmission lanes.

Referring to FIG. 10C, a UFS system 10 may include one first transmission lane 310-1, one first receiving lane 320-1, and three bidirectional lanes. Descriptions that overlap the description of FIG. 10A and/or FIG. 10B will be omitted to the extent possible for the sake of brevity. Referring to the embodiments shown in FIG. 10A, FIG. 10B and FIG. 10C, even when a transceiving clock speed of data is not increased, the UFS system 10 may achieve various transceiving data rates based on a bandwidth, which is determined according to the switching setting of a plurality of bidirectional lanes.

In the above-described embodiments, the UFS host 100 including the application (refer to 150 in FIG. 2) may determine to switch an operation mode of at least one bidirectional lane, and matches operation modes of the transmission and receiving lanes by transmitting a switching result to a UFS device 200. Thus, the UFS host 100 may transmit and receive data along a changed stream direction of the at least one bidirectional lane.

Figure 11:
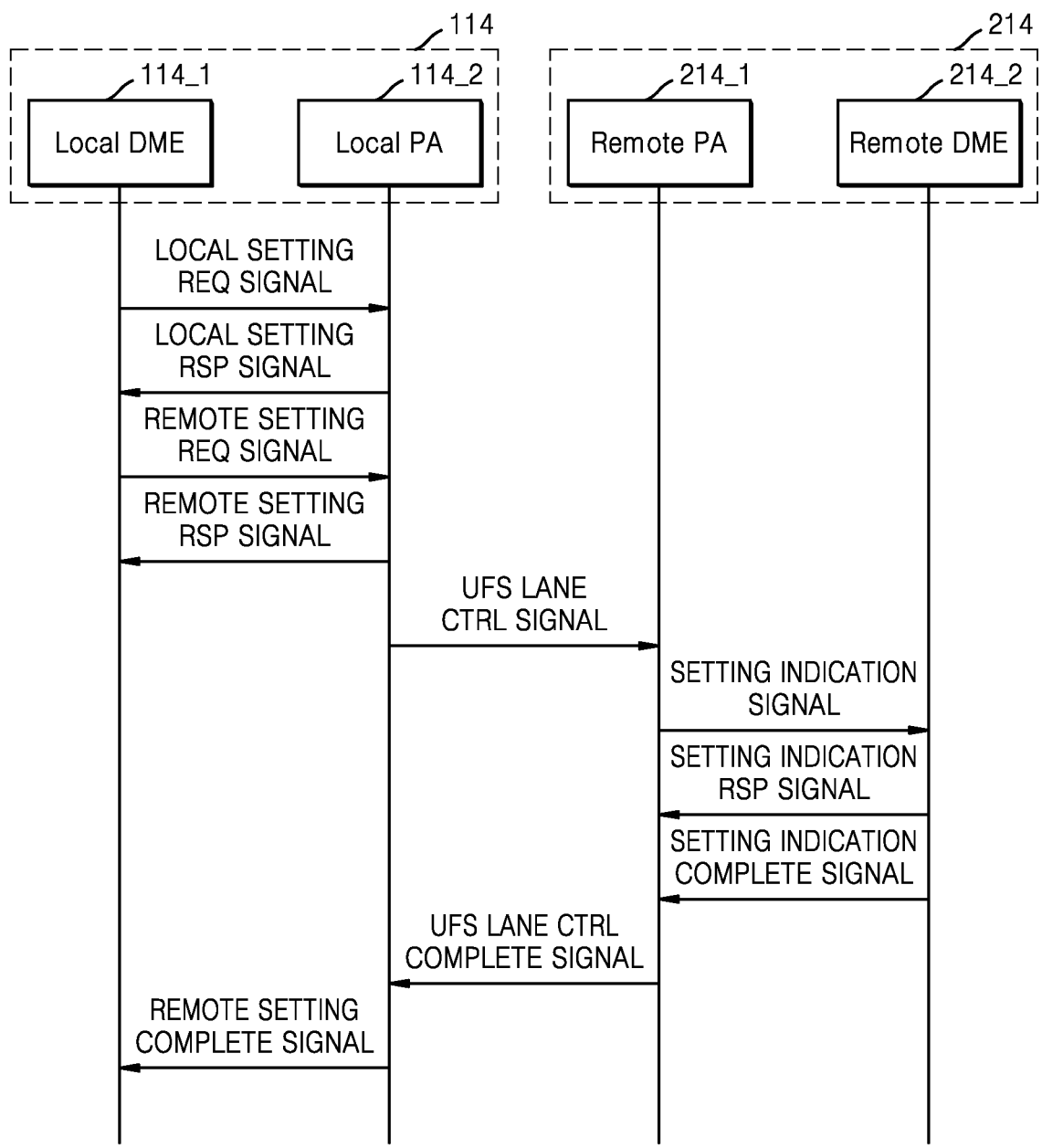
FIG. 11 illustrates a signal exchange diagram according to an example embodiment.

FIG. 11 illustrates an example of a signal exchange diagram according to an example embodiment.

Referring to FIG. 11, signals may be exchanged between a local DME 114-1 (local device management entity (DME)) and a local PA 114-2 (local PHY adapter (PA)). The local DME 114-1 and the local PA 114-2 may be included in an MIPI Unipro 114 of the UIC layer 110 shown in FIG. 2.

The local DME 114-1 and the local PA 114-2 may refer to local devices configured to firstly generate or initiate signals, from among devices of a UFS system 10. That is, a UFS local device may be the UFS host 100 shown in FIG. 2 or the UFS device 200 shown in FIG. 2.

According to various embodiments, the local DME 114-1 may transmit a local setting request signal LOCAL SETTING REQ SIGNAL to the local PA 114-2. The local setting request signal LOCAL SETTING REQ SIGNAL may refer to a signal for completing internal setting of the UFS local device. For example, referring to an MIPI Unipro standard, the local setting request signal may correspond to a PA_LM_SET.req signal.

According to various embodiments, the local setting request signal LOCAL SETTING REQ SIGNAL may include information about the number of active transmission data lanes and the number of active receiving data lanes. For example, referring to the MIPI Unipro standard, the PA_LM_SET.req signal may include a plurality of fields. The plurality of fields may include attribute setting types AttrSetType, management information base (MIB) attributes MIBattribute, MIB values MIBvalue, and selector indices SelectorIndex.

According to various embodiments, the local setting request signal LOCAL SETTING REQ SIGNAL may include information about the number of active transmission data lanes and the number of active receiving data lanes may be generated with reference to Table 1.

TABLE 1

| Attribute | Attribute ID | Valid Attribute Values(s) |
|---|---|---|
| PA_ActiveTxDataLanes | 0x1560 | 1 to PA_AvailTxDataLanes |
| PA_ActiveRxDataLanes | 0x1580 | 1 to PA_AvailRxDataLanes |

An attribute identification (ID) of information about the active transmission data lane may correspond to "0x1560," and a valid attribute value of the information may be in a range of 1 to a maximum number of available transmission data lanes.

An attribute ID of information about the active receiving data lane may correspond to "0x1580," and a valid attribute value of the information may be in a range of 1 to a maximum number of available receiving data lanes. Here, the maximum number of available transmission data lanes may correspond to the sum of the number of transmission lanes and the number of at least one bidirectional lane. When all of the at least one bidirectional lane operates as a transmission lane, the number of available transmission data lanes may be maximized. Similar to the maximum number of available transmission data lines, the maximum number of available receiving data lanes may correspond to the sum of the number of receiving lanes and the number of at least one bidirectional lane. Referring to FIG. 10A together, because each of the number of receiving lanes and the number of transmission lanes is 1 and the number of at least one bidirectional lanes is 4, each of the maximum number of available transmission data lanes and the maximum number of available receiving data lanes may be 5.

That is, the local DME 114-1 may transmit a local setting request signal LOCAL SETTING REQ SIGNAL including information about the active transmission data lanes and the active receiving data lanes to the local PA 114-2 and instruct the local PA 114-2 to switch an operation mode of the at least one bidirectional lane of the UFS local device. The local PA 114-2 may receive the local setting request signal LOCAL SETTING REQ SIGNAL from the local DME 114-1, decode the local setting request signal LOCAL SETTING REQ SIGNAL, and switch the at least one bidirectional lane to the receiving lane or the transmission lane. After the switching operation is completed, the local PA 114-2 may transmit a local setting response signal LOCAL SETTING RSP SIGNAL indicating that the setting of the UFS local device has been completed, to the local DME 114-1. For example, referring to the MIPI Unipro standard, the local setting response signal LOCAL SETTING RSP SIGNAL may correspond to a PA_LM_SET.cnf signal.

According to various embodiments, the local DME 114-1 may transmit a remote setting request signal REMOTE SETTING REQ SIGNAL to the local PA 114-2 in response to the receiving of the local setting response signal LOCAL SETTING RSP SIGNAL. When the local setting response signal LOCAL SETTING RSP SIGNAL is received, because the switching of the operation mode of the at least one bidirectional lane of the UFS local device is completed, the setting of a UFS remote device may be performed. For example, referring to the MIPI Unipro standard, the remote setting request signal REMOTE SETTING REQ SIGNAL may correspond to a PA_LM_PEER_SET.req signal. Because the remote setting request signal REMOTE SETTING REQ SIGNAL includes the same fields and values as the local setting request signal LOCAL SETTING REQ SIGNAL described above, repeated descriptions are omitted. However, the number of active transmission data lanes for the remote setting request signal REMOTE SEETING REQ SIGNAL may be set to be equal to the number of active receiving data lanes for the local setting request signal LOCAL SETTING REQ SIGNAL, and the number of active receiving data lanes for the remote setting request signal REMOTE SETTING REQ SIGNAL may be set to be equal to the number of active transmission data lanes for the local setting request signal LOCAL SETTING REQ SIGNAL. Because the UFS local device and the UFS remote device perform transmission and receiving operations via the same UFS lanes, the number of transmission lanes of the UFS local device may be equal to the number of receiving lanes of the UFS remote device.

The local PA 114-2 may transmit a UFS lane control signal UFS LANE CTRL SIGNAL to a remote PA 214-1. Referring to FIG. 2 together, the remote PA 214-1 may be included in the MIPI Unipro 214 of the UIC layer 210 of the UFS device 200, which is an example of the UFS remote device that is a counterpart UFS device of the UFS local device. The UFS lane control signal may be transmitted to the UFS remote device via the MIPI M-PHY 112 or 212 and transmission lanes to the UFS remote device. For example, referring to the MIPI Unipro standard, the UFS lane control signal may correspond to a PACP_SET_req signal. In addition, the local PA 114-2 may transmit a remote setting response signal REMOTE SETTING RSP SIGNAL to the local DME 114-1 to inform the local DME 114-1 that the PACP_SET_req signal has been transmitted to the remote PA 214-1 that is a counterpart UFS device. The remote setting response signal REMOTE SETTING RSP SIGNAL may correspond to a PA_LM_PEER_SET.cnf_L signal shown in the MIPI Unipro standard.

The remote PA 214-1 may transmit a setting indication signal SETTING INDICATION SIGNAL to a remote DME 214-2 in response to the receiving of the UFS lane control signal. For example, referring to the MIPI Unipro standard, the setting indication signal may correspond to a PA_LM_PEER_SET.ind signal. That is, because the remote PA 214-1 receives a lane setting signal from the counterpart UFS device, the remote PA 214-1 may transmit the received signal to the remote DME 214-2 and control the remote DME 214-2 to switch the operation mode of the at least one bidirectional lane. The setting indication signal SETING INDICATION SIGNAL may include information about the UFS lane control signal received from the local PA 114-2 of the UFS local device. For example, the setting indication signal SETTING INDICATION SIGNAL may include information about the number of active transmission data lanes and the number of active receiving data lanes. The remote DME 214-2 may transmit setting indication response signal SETTING INDICATION RSP SIGNAL to the remote PA 214-1 in response to the receiving of the setting indication information. The remote DME 214-2 may inform the remote PA 214-1 that the setting indication signal SETTING INDICATION SIGNAL has been successfully received, by transmitting the setting indication response signal SETTING INDICATION RES SIGNAL to the remote PA 214-1. For example, referring to the MIPI Unipro standard, the setting indication response signal may correspond to a PA_LM_PEER_SET.rsp_L signal.

The remote DME 214-2 may switch the operation mode of the at least one bidirectional lane based on the received setting indication signal SETTING INDICATION SIGNAL. For example, the remote DME 214-2 may set the at least one bidirectional lane to a downstream lane or an upstream lane, based on the numbers of active receiving data lanes and active transmission data lanes, which are included in the received setting indication signal SETTING INDICATION SIGNAL. For example, referring to FIG. 10A together, based on the setting indication signal SETTING INDICATION SIGNAL, the UFS remote device may switch the operation mode of the at least one bidirectional lane such that each of bidirectional lanes operates as the downstream UFS lane.

The remote DME 214-2 may transmit a setting indication completion signal SETTING INDICATION COMPLETE SIGNAL to the remote PA 214-1. By transmitting the setting indication completion signal SETTING INDICATION COMPLETE SIGNAL, which indicates that the switching of the operation mode of the at least one bidirectional lane has been completed, through the remote PA 214-1 to the UFS local device, a data transceiving operation may be started using a changed number of transmission lanes and a changed number of receiving lanes. For example, referring to the MIPI Unipro standard, the setting indication completion signal may correspond to a PA_LM_PEER_SET.rsp signal.

The remote PA 214-1 may transmit a UFS lane control completion signal UFS LANE CTRL COMPLETE SIGNAL to the UFS local device in response to the receiving of the setting indication completion signal SETTING INDICATION COMPLETE SIGNAL from the remote DME 214-2. More specifically, the remote PA 214-1 may transmit the UFS lane control completion signal UFS LANE CTRL COMPLETE SIGNAL to the local PA 114-2 of the UFS local device. For example, referring to the MIPI Unipro standard, the UFS lane control completion signal may correspond to a PACP_SET_cnf signal.

The local PA 114-2 may receive the UFS lane control completion signal UFS LANE CTRL COMPLETE SIGNAL and may transmit a remote setting completion signal REMOTE SETTING COMPLETE SIGNAL indicating that the setting of the UFS remote device has been completed, to the local DME 114-1. The local DME 114-1 may transmit and receive data to and from the UFS remote device in response to the receiving of the remote setting completion signal REMOTE SETTING COMPLETE SIGNAL. For example, referring to the MIPI Unipro standard, the remote setting completion signal may correspond to a PA_LM_PEER_SET.cnf signal. Referring to the signal exchange diagram of FIG. 11, it can be seen that the UFS host 100 and the UFS device 200 may indicate the operation mode for the at least one bidirectional lane by using fields including PA_ActiveRxDataLane and PA_ActiveTxDataLane, which are predefined in the MIPI Unipro standard.

Referring to the above-described embodiments, the signal exchange diagram of FIG. 11 may correspond to a signal exchange diagram for controlling UFS lanes before a data transceiving operation starts. However, embodiments based on FIG. 11 are not limited to an example of setting the UFS lanes before the data transceiving operation starts. According to various embodiments, even when a power mode is changed after the data transceiving operation, the operation mode of the at least one bidirectional lanes may be switched. According to an embodiment, the UFS local device may change the power mode by transmitting a PACP_PWR_req signal to the UFS remote device. In this case, a reserved bit of PA_PWRModeUs_erData included in the PACP_PWR_req signal may be used. Referring to the MIPI Unipro standard, reserved bits of "0x15B6" to "0x15BB" of a PA_PWRModeUserData field may be set to include information about the number of active receiving lanes, the number of active transmission lanes, and selector index SelectorIndex as described above.

Figure 12:
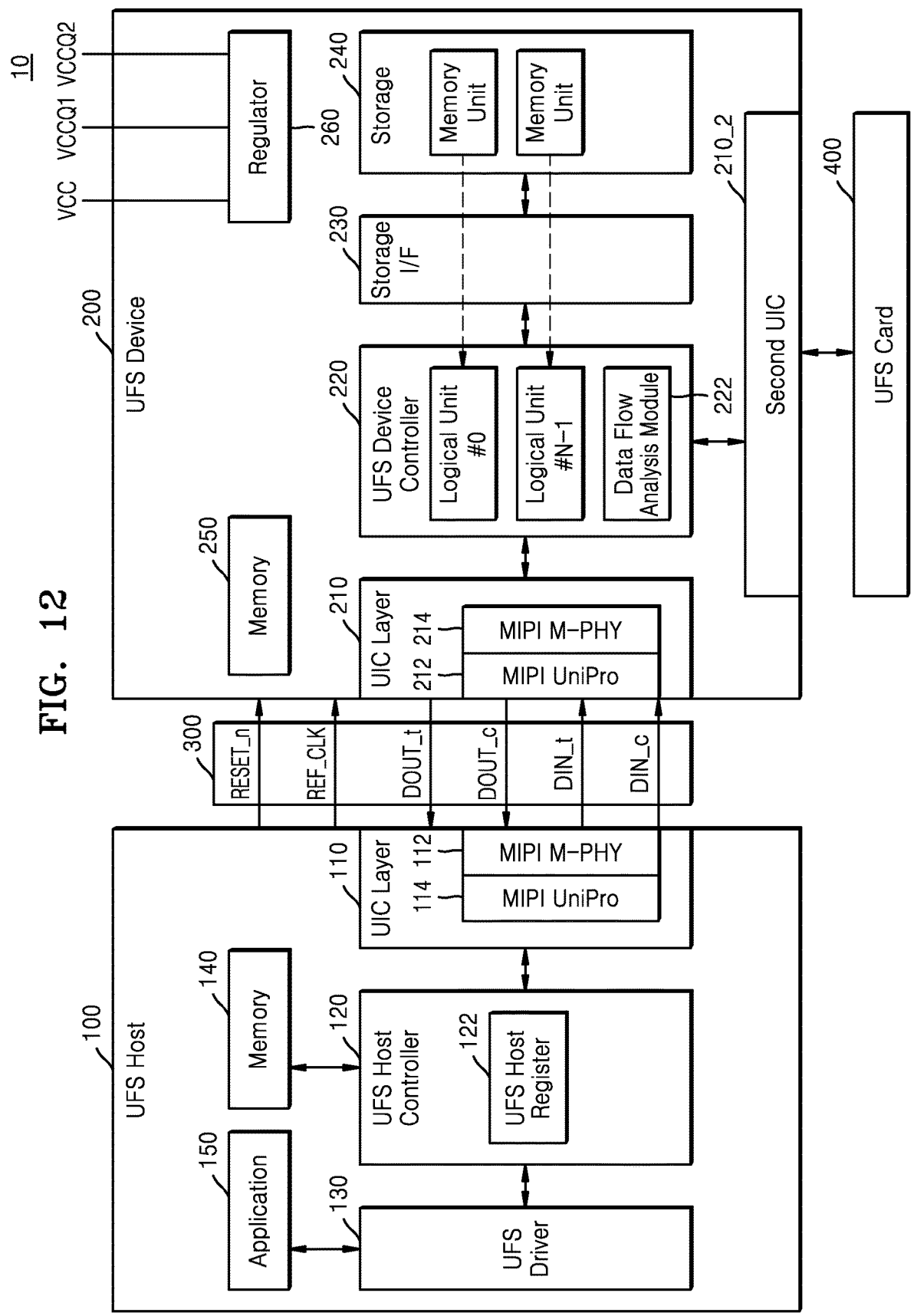
FIG. 12 illustrates a UFS system including a UFS card, according to an example embodiment.

FIG. 12 illustrates another example of a UFS system according to an example embodiment.

Referring to FIG. 12, a UFS device 200 may include a plurality of UIC layers. For example, the plurality of UIC layers a first UIC layer 210-1 and a second UIC layer 210-2.

The first UIC layer 210-1 may refer to a UIC layer configured to interface with the UFS host 100. The second UIC layer 210-2 may correspond to a UIC layer configured to interface with a UFS card 400. According to various embodiments, the UFS device 200 may correspond to an eUFS. That is, the UFS host 100 and the UFS device 200 may be embedded in the same printed circuitry board (PCB). That is, the UFS device 200 may be on a same substrate as the UFS host 100.

According to various embodiments, a UFS system 10 may further include the UFS card 400. The UFS card 400 may refer to a portable UFS device, which may be detachably attached to an electronic device including the UFS system 10. For example, the second UIC layer 210-2 may correspond to a CF card interface. Because the UFS card 400 may be optionally connected to the UFS device 200, the UFS device 200 may include the second UIC layer 210-2 configured to interface with the UFS card 400. Although not shown in FIG. 12, the UFS card 400 may include at least the same blocks as those of the UFS device 200.

According to various embodiments, the UFS host 100 may be electrically connected to the UFS device 200, and the UFS device 200 may be electrically connected to the UFS card 400. For example, the UFS host 100, the UFS device 200, and the UFS card 400 may be connected in series to each other. That is, the UFS system 10 adopting an SCSI interface may support a daisy chain scheme. Referring to FIG. 12, the UFS system 10 may support a daisy chain scheme for three UFS devices, that is, the UFS host 100, the UFS device 200, and the UFS card 400.

According to various embodiments, to prevent performance degradation due to the allocation of resources required for data flow analysis and an overhead in the UFS card 400, the UFS card 400 may not include a data flow analysis module 222, unlike the UFS device 200. In this case, the UFS device 200 may change an operation mode of an additional UFS data lane connected to the UFS card 400.

According to an embodiment, the UFS device 200 may transmit a control signal for instructing the UFS host 100 and the UFS card 400 to change the operation mode, to the UFS host 100 and the UFS card 400, based on the data flow analysis module 222. For example, the UFS device controller 220 may identify an operation mode of at least one bidirectional UFS lane, from among UFS data lanes connected to the UFS host 100, and instruct the UFS host 100 to transmit data along a first direction or a second direction. The first direction may correspond to a direction in which data is transmitted from the UFS device 200 to the UFS host 100, and the second direction may correspond to a direction in which data is transmitted from the UFS host 100 to the UFS device 200. As another example, the UFS device controller 220 may identify an operation mode of at least one bidirectional UFS lane, from among additional UFS data lanes connected to the UFS card 400, and instruct the UFS card 400 to transmit data along a third direction or a fourth direction. The third direction may correspond to a direction in which data is transmitted from the UFS card 400 to the UFS device 200, and the fourth direction may correspond to a direction in which data is transmitted from the UFS device 200 to the UFS card 400.

According to another embodiment, the UFS host 100 may transmit a control signal for instructing the UFS device 200 to change the operation mode, to the UFS device 200. For example, an application 150 may transmit a control signal indicating a data transmission direction of at least one bidirectional UFS lane to the UFS device 200, based on a load ratio between read data received from the UFS device 200 and write data transmitted to the UFS device 200. The UFS device 200 may receive the control signal from the UFS host 100 and may transmit an additional control signal to the UFS card 400. The additional control signal may be a signal for controlling a data transmission direction of at least one bidirectional UFS lane, from among the additional UFS data lanes connected to the UFS card 400, to match the data transmission direction of the at least one bidirectional UFS lane, which is changed in response to the control signal received by the UFS device 200 from the UFS host 100.

According to the above-described embodiments, the UFS device 200 may control an operation mode of the UFS card 400 connected thereto by using a daisy chain scheme, and thus, the allocation of resources for the operation-mode management of the UFS host 100 may be reduced, and performance may be improved.

While the inventive concept(s) described herein have been particularly shown and described with reference to embodiments thereof, it will be understood that various changes in form and details may be made therein without departing from the spirit and scope of the following claims.

What is claimed is:

1. A universal flash storage (UFS) device, comprising:
a UFS data lane configured to connect with a UFS host, the UFS data lane comprising a first UFS data lane for a first direction in which data is output to the UFS host, a second UFS data lane for a second direction in which data is received from the UFS host, and bidirectional UFS lanes configured to switch between the first direction and the second direction according to a transceiving mode of the bidirectional UFS lanes; and
a UFS device controller configured to switch a data transmission direction of one or more of the bidirectional UFS lanes, based on a control signal, output by the UFS device and received by the UFS host, wherein the control signal is configured to instruct the UFS host to initiate switching of the transceiving mode of the bidirectional UFS lanes between the first direction and the second direction,
wherein the control signal is based upon a comparison of a size of the data output to the UFS host with a first threshold value and a comparison of a size of the data received from the UFS host with a second threshold value,
wherein the first threshold value comprises a first upper-limit threshold value that corresponds to a value at which saturation of transmission speed occurs, when the data output to the UFS host is transmitted via the first UFS data lane, and
wherein the second threshold value comprises a second upper-limit threshold value that corresponds to a value at which saturation of receiving speed occurs, when the data is received from the UFS host via the second UFS data lane.

2. The UFS device of claim 1, further comprising:
a UFS interface circuit configured to connect the UFS data lane to the UFS device controller,
wherein the UFS interface circuit further comprises:
a lane distributing circuit configured to uniformly distribute data symbols output to the UFS host via the bidirectional UFS lanes for the first direction;
a lane merging circuit configured to merge data symbols received from the UFS host via the bidirectional UFS lanes for the second direction; and
a plurality of switching circuits configured to activate the lane distributing circuit or the lane merging circuit according to the transceiving mode.

3. The UFS device of claim 2, wherein the UFS device controller further comprises a monitoring circuit configured to determine the transceiving mode, based on at least the size of the data output to the UFS host and the size of the data received from the UFS host.

4. The UFS device of claim 3,
wherein the monitoring circuit is configured to determine the transceiving mode of the bidirectional UFS lanes, based on a first ratio and a second ratio,
wherein the first ratio is a ratio of the size of the data transmitted by the bidirectional UFS lanes for the first direction to the size of the data output to the UFS host, and the second ratio is a ratio of the size of the data transmitted by the bidirectional UFS lanes for the second direction to the size of the data received from the UFS host.

5. The UFS device of claim 4, wherein the monitoring circuit is configured to:
switch the bidirectional UFS lanes such that a number of the bidirectional UFS lanes corresponding to the first direction is greater than a number of the bidirectional UFS lanes corresponding to the second direction, when the first ratio is greater than the second ratio,
switch the bidirectional UFS lanes such that the number of the bidirectional UFS lanes corresponding to the first direction is less than the number of the bidirectional UFS lanes corresponding to the second direction when the first ratio is less than the second ratio, and
deactivate at least one of the bidirectional UFS lanes when each of the first ratio and the second ratio is less than a third threshold value.

6. The UFS device of claim 4, wherein the UFS device controller is configured to transmit the control signal to the UFS host.

7. The UFS device of claim 2,
wherein the lane merging circuit is configured to merge data symbols received via at least two of the bidirectional UFS lanes into one symbol stream, and
the lane distributing circuit is configured to divide the one symbol stream into uniform data symbols via the at least two of the bidirectional UFS lanes.

8. The UFS device of claim 2, wherein the UFS device controller is configured to identify the transceiving mode based on the control signal and control the plurality of switching circuits to activate the lane distributing circuit or the lane merging circuit according to the identified transceiving mode.

9. A universal flash storage (UFS) system comprising:
a UFS host comprising an application processor comprising at least one core configured to execute instructions;
a UFS driver configured to receive a request from the application processor and translate the request into a translated UFS command; and
a UFS host controller configured to transmit the translated UFS command to a UFS device,
wherein the UFS device is configured to control a UFS device controller configured to switch a data transmission direction of one or more bidirectional UFS lanes based on a UFS data lane and a transceiving mode of the bidirectional UFS lanes,
wherein the UFS data lane connects the UFS device and the UFS host, and comprises a first UFS lane for a first direction in which read data is output from the UFS device to the UFS host, and a second UFS lane for a second direction in which write data is output to the UFS device from the UFS host, and
wherein each of the bidirectional UFS lanes is configured to switch between the first direction and the second direction, based on a control signal, output by the UFS device and received by the UFS host, wherein the control signal is configured to instruct the UFS host to initiate switching of the transceiving mode of the bidirectional UFS lanes between the first direction and the second direction,
wherein the control signal is based upon a comparison of a size of the read data output from the UFS device with a first threshold value and comparison of a size of the write data output to the UFS device with a second threshold value,
wherein the first threshold value comprises a first upper-limit threshold value that corresponds to a value at which saturation of transmission speed occurs, when the read data is output from the UFS device via the first UFS lane, and
wherein the second threshold value comprises a second upper-limit threshold value that corresponds to a value at which saturation of receiving speed occurs, when the write data is output to the UFS device via the second UFS lane.

10. The UFS system of claim 9,
wherein the application processor is configured to determine the transceiving mode based on state information indicative of an extent to which the UFS data lane is occupied by the read data or the write data, and transmit the control signal to the UFS host,
wherein the state information comprises at least one of a first ratio and a second ratio,
wherein the first ratio indicates a load ratio of the UFS lane for the first direction to the size of the read data output from the UFS device to the UFS host, and
wherein the second ratio indicates a load ratio of the UFS lane for the second direction to the size of the write data output to the UFS device from the UFS host.

11. The UFS system of claim 10,
wherein the application processor is configured to compare the state information with the first threshold value, the second threshold value, and a third threshold value, and determine the transceiving mode of the bidirectional UFS lanes, and
wherein the first threshold value comprises a read upper-limit threshold value at which a receiving speed is saturated when the read data is received via the bidirectional UFS lanes for the first direction, the second threshold value comprises a write upper-limit threshold value at which a transmission speed is saturated when the write data is transmitted via the bidirectional UFS lanes for the second direction, and the third threshold value comprises a lower-limit threshold value at which saturation of the receiving speed or saturation of the transmission speed does not occur when at least some of the bidirectional UFS lanes are deactivated.

12. The UFS system of claim 11, wherein the application processor is configured to:
switch at least a first portion of the bidirectional UFS lanes according to a first transceiving mode to transmit the read data in the first direction when the first ratio included in the state information exceeds the read upper-limit threshold value, or
switch at least a second portion of the bidirectional UFS lanes according to a second transceiving mode to transmit the write data in the second direction when the second ratio included in the state information exceeds the write upper-limit threshold value, or
deactivate at least a third portion of the bidirectional UFS lanes according to a third transceiving mode when each of the first ratio and the second ratio is less than the lower-limit threshold value.

13. The UFS system of claim 12, wherein the UFS device further comprises a UFS interface circuit configured to connect the UFS data lane to the UFS device controller,
wherein the UFS interface circuit further comprises:
a lane distributing circuit configured to uniformly distribute data symbols output from the UFS device to the UFS host via the bidirectional UFS lanes for the first direction;

a lane merging circuit configured to merge data symbols received by the UFS device from the UFS host via the bidirectional UFS lanes for the second direction; and switching circuits configured to activate the lane distributing circuit according to the first transceiving mode or activate the lane merging circuit according to the second transceiving mode.

14. The UFS system of claim 13, wherein the lane merging circuit is configured to merge the data symbols received via the first portion of the bidirectional UFS lanes into one symbol stream, and wherein the lane distributing circuit is configured to divide the one symbol stream into uniform data symbols via the first portion of the bidirectional UFS lanes.

15. A first universal flash storage (UFS) device, comprising:

a UFS data lane configured to connect with a UFS host, the UFS data lane comprising a receiving lane configured to receive input data from a second UFS device, a transmission lane configured to transmit output data to the second UFS device, and bidirectional lanes configured to transmit at least one of the input data or the output data according to a transceiving mode of the bidirectional lanes; and a UFS controller configured to generate a state information value, based on a size of the input data or a size of the output data and a number of at least one of the receiving lane, the transmission lane, and the bidirectional lanes, determine the transceiving mode of each of the bidirectional lanes, based on the state information value, and transmit a control signal configured to instruct the UFS host to initiate switching of the transceiving mode of at least one of the bidirectional lanes, wherein the control signal is based upon a comparison of a size of the input data with a first threshold value and comparison of a size of the output data with a second threshold value, wherein the first threshold value comprises a first upper-limit threshold value that corresponds to a value at which saturation of transmission speed occurs, when the input data is transmitted via the receiving lane, wherein the second threshold value comprises a second upper-limit threshold value that corresponds to a value at which saturation of receiving speed occurs, when the output data is received via the transmission lane, and wherein the UFS host is configured to determine a type of command for transmission to the second UFS device based upon the transceiving mode.

16. The first UFS device of claim 15, wherein the UFS controller is configured to switch at least one of the bidirectional lanes to a transmission mode and output transmission data via the at least one of the bidirectional lanes together with the transmission lane when the state information value exceeds the first upper-limit threshold value.

17. The first UFS device of claim 15, wherein the UFS controller is configured to switch at least one of the bidirectional lanes to a receiving mode and receive receiving data via the at least one of the bidirectional lanes along with the receiving lane when the state information value exceeds the second upper-limit threshold value.

18. The first UFS device of claim 15, wherein the UFS controller is configured to deactivate a portion of the bidirectional lanes when the state information value is less than a lower-limit threshold value that corresponds to a value at which a portion of the bidirectional lanes are deactivated.

* * * * *